(12) United States Patent
Paluri et al.

(10) Patent No.: US 11,477,454 B2
(45) Date of Patent: Oct. 18, 2022

(54) IMAGE DECODING METHOD BASED ON CHROMA QUANTIZATION PARAMETER DATA, AND APPARATUS THEREFOR

(71) Applicant: LG Electronics Inc., Seoul (KR)

(72) Inventors: Seethal Paluri, Seoul (KR); Seunghwan Kim, Seoul (KR); Jie Zhao, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/546,507

(22) Filed: Dec. 9, 2021

(65) Prior Publication Data

US 2022/0103821 A1 Mar. 31, 2022

Related U.S. Application Data

(63) Continuation of application No. PCT/KR2020/007584, filed on Jun. 11, 2020.

(60) Provisional application No. 62/860,237, filed on Jun. 11, 2019.

(51) Int. Cl.
| | | |
|---|---|---|
| *H04B 1/66* | (2006.01) | |
| *H04N 7/12* | (2006.01) | |
| *H04N 11/02* | (2006.01) | |
| *H04N 11/04* | (2006.01) | |
| *H04N 19/124* | (2014.01) | |
| *H04N 19/70* | (2014.01) | |
| *H04N 19/186* | (2014.01) | |
| *H04N 19/132* | (2014.01) | |

(52) U.S. Cl.
CPC ......... *H04N 19/124* (2014.11); *H04N 19/132* (2014.11); *H04N 19/186* (2014.11); *H04N 19/70* (2014.11)

(58) Field of Classification Search
CPC .................................................. H04N 19/124
See application file for complete search history.

(56) References Cited

U.S. PATENT DOCUMENTS

| | | | |
|---|---|---|---|
| 2019/0068977 A1 | 2/2019 | Zhang et al. | |
| 2020/0260070 A1* | 8/2020 | Yoo ...................... | H04N 19/157 |
| 2022/0038693 A1* | 2/2022 | Zhang .................. | H04N 19/176 |
| 2022/0046275 A1* | 2/2022 | Kalva .................... | H04N 19/70 |

FOREIGN PATENT DOCUMENTS

| | | |
|---|---|---|
| KR | 20140088098 | 7/2014 |
| KR | 20170054561 | 5/2017 |
| KR | 20180049185 | 5/2018 |
| WO | WO2019007917 | 1/2019 |

* cited by examiner

*Primary Examiner* — Fabio S Lima
(74) *Attorney, Agent, or Firm* — Fish & Richardson P.C.

(57) ABSTRACT

An image decoding method performed by a decoding apparatus according to the present document comprises the steps of: obtaining a flag indicating whether quantization parameter data for combined chroma coding is present on the basis of a type of chroma; obtaining the quantization parameter data for the combined chroma coding on the basis of the flag; deriving a chroma quantization parameter table on the basis of the quantization parameter data; deriving a quantization parameter for the combined chroma coding on the basis of the chroma quantization parameter table; deriving residual samples on the basis of the quantization parameter; and generating a reconstructed picture on the basis of the residual samples.

15 Claims, 8 Drawing Sheets

IMAGE DECODING METHOD BASED ON CHROMA QUANTIZATION PARAMETER DATA, AND APPARATUS THEREFOR

CROSS-REFERENCE TO RELATED APPLICATIONS

Pursuant to 35 U.S.C. § 119(e), this application is a continuation of International Application PCT/KR2020/007584, with an international filing date of Jun. 11, 2020, which claims the benefit of U.S. Provisional Patent Application No. 62/860,237, filed on Jun. 11, 2019, the contents of which are hereby incorporated by reference herein in its entirety.

BACKGROUND OF THE DISCLOSURE

Field of the Disclosure

This document relates to an image coding technology and, more particularly, to an image decoding method of coding image information based on chroma quantization parameter data for a chroma component in an image coding system and an apparatus thereof.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another object of this document is to provide a method and apparatus for improving efficiency of data coding for quantization parameter derivation for a chroma component.

According to an embodiment of this document, there is provided an image decoding method performed by a decoding apparatus. The method includes obtaining a flag representing whether quantization parameter data for combined chroma coding is present, based on a chroma type, obtaining the quantization parameter data for the combined chroma coding based on the flag, deriving a chroma quantization parameter table based on the quantization parameter data, deriving a quantization parameter for the combined chroma coding based on the chroma quantization parameter table, deriving residual samples based on the quantization parameter, and generating a reconstructed picture based on the residual samples.

According to another embodiment of this document, there is provided a decoding apparatus performing image decoding. The decoding apparatus includes an entropy decoder configured to obtain a flag representing whether quantization parameter data for combined chroma coding is present, based on a chroma type and to obtain the quantization parameter data for the combined chroma coding based on the flag, a residual processor configured to derive a chroma quantization parameter table based on the quantization parameter data, to derive a quantization parameter for the combined chroma coding based on the chroma quantization parameter table, to derive residual samples based on the quantization parameter, and an adder configured to generate a reconstructed picture based on the residual samples.

According to still another embodiment of this document, there is provided a video encoding method performed by an encoding apparatus. The method includes deriving residual samples for a chroma component, generating quantization parameter data for combined chroma coding of the residual samples based on a chroma type of the chroma component, generating a flag representing whether the quantization parameter data for the combined chroma coding is present, and encoding the quantization parameter data and the flag.

According to still another embodiment of this document, there is provided a video encoding apparatus. The encoding apparatus includes a residual processor configured to derive residual samples for a chroma component, to generate quantization parameter data for combined chroma coding of the residual samples based on a chroma type of the chroma component and to generate a flag representing whether the quantization parameter data for the combined chroma coding is present, and an entropy encoder configured to encode the quantization parameter data and the flag.

Advantageous Effects

According to the present disclosure, a quantization parameter table for quantization parameter derivation can be determined based on a flag representing whether quantization parameter data for deriving a quantization parameter for a chroma component has been transmitted, and coding efficiency can be improved by performing coding based on a quantization parameter according to characteristics of an image.

According to the present disclosure, a quantization parameter table for a chroma component can be determined based on signaled chroma quantization data, and coding efficiency can be improved by performing coding based on a quantization parameter according to characteristics of an image.

DESCRIPTION OF EXEMPLARY EMBODIMENTS

Figure 1:
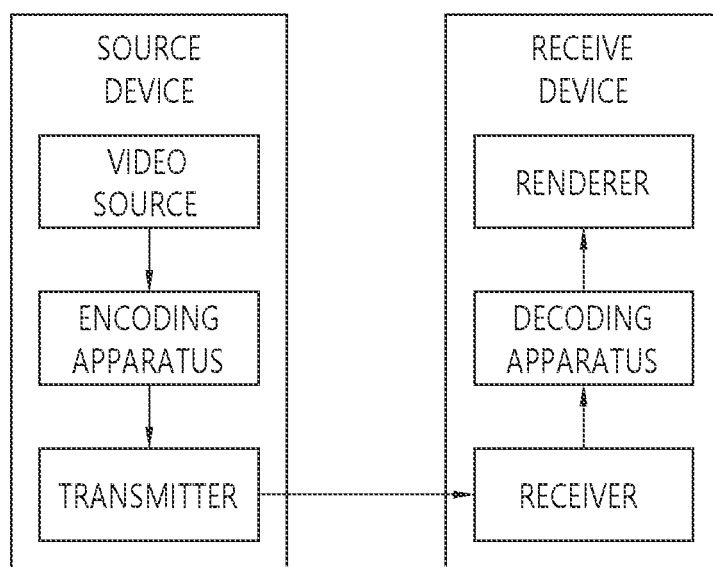
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
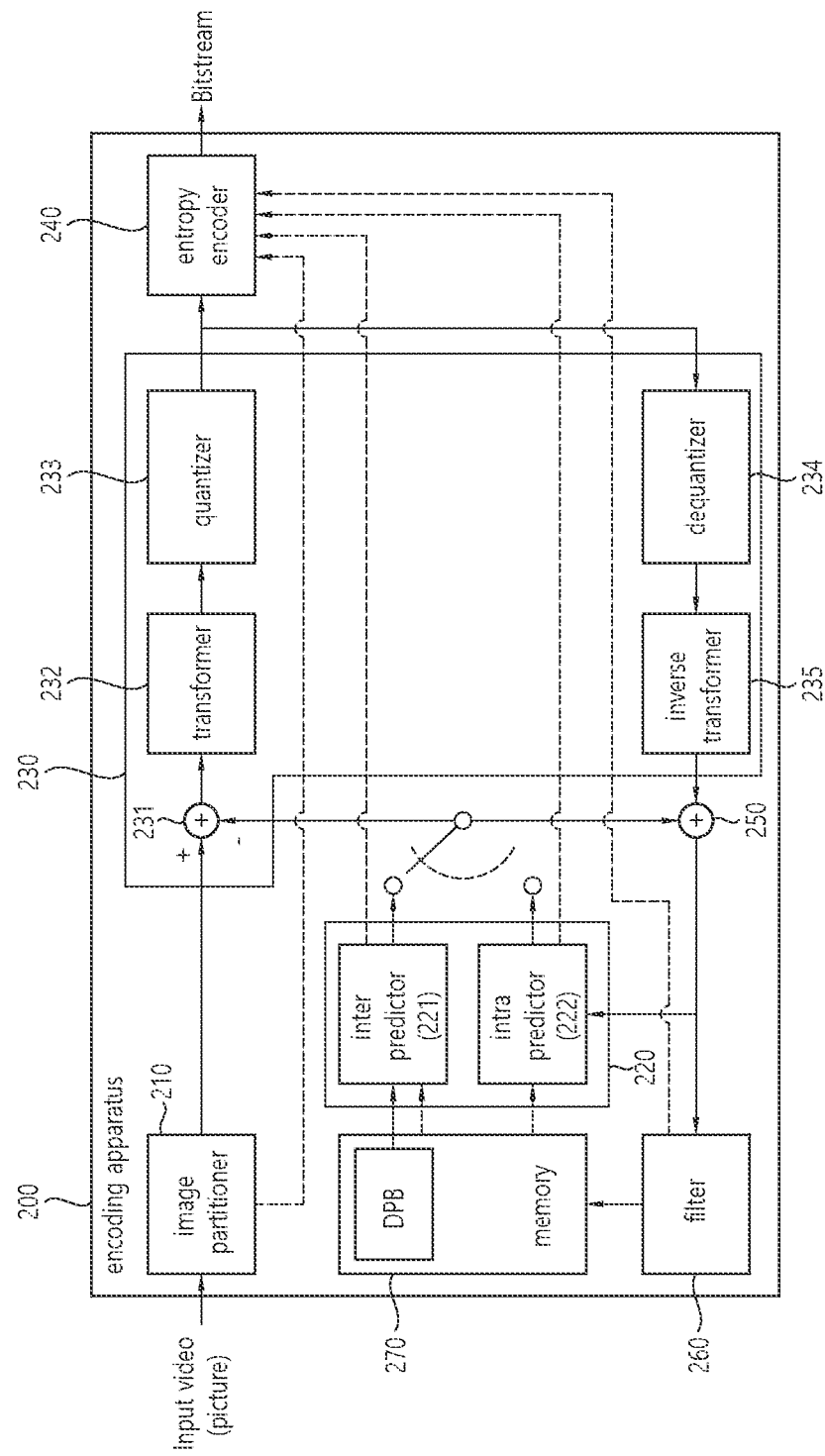
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
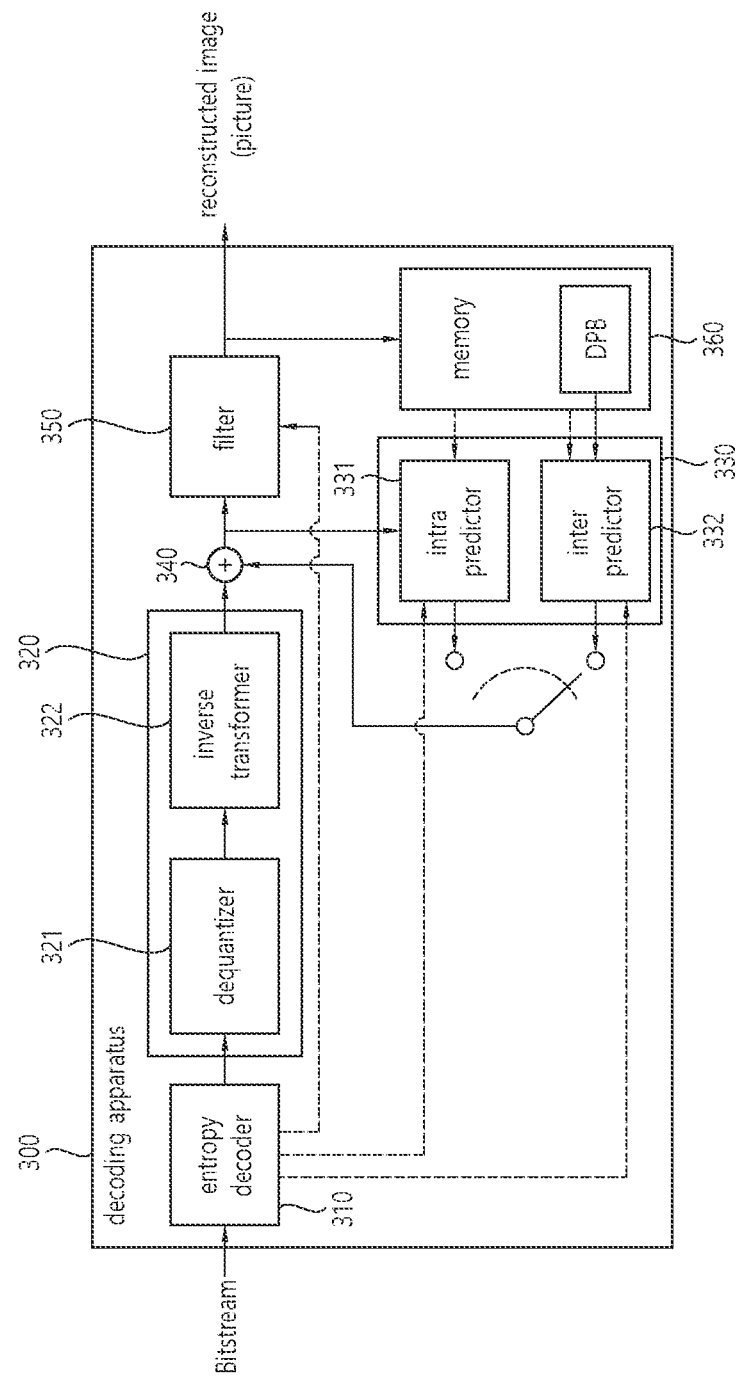
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, the quantizer of the encoding apparatus may derive quantized transform coefficients by applying quantization to transform coefficients. The dequantizer of the encoding apparatus or the dequantizer of the decoding apparatus may derive transform coefficients by applying dequantization to the quantized transform coefficients.

In general, in video/image coding, a quantization ratio may be changed, and a compression rate may be adjusted using the changed quantization ratio. In an implementation aspect, a quantization parameter (QP) may be used instead of directly using the quantization ratio by considering complexity. For example, quantization parameters having integer values of 0 to 63 may be used, and each quantization parameter value may correspond to an actual quantization ratio. Furthermore, for example, a quantization parameter $QP_Y$ for a luma component and a quantization parameter $QP_C$ for a chroma component may be different configured.

In a quantization process, a transform coefficient C may be an input, a quantization ratio ($Q_{step}$) may be divided, and a quantized transform coefficient C' may be obtained based on the quantization ratio. In this case, the quantization ratio may be produced in an integer form by multiplying the quantization ratio by a scale by considering calculation complexity, and a shift operation may be performed by a value corresponding to a scale value. A quantization scale may be derived based on the product of the quantization ratio and the scale value. That is, the quantization scale may be derived based on the QP. For example, the quantization scale may be applied to the transform coefficient C', and a quantized transform coefficient C' may be derived based on a result of the application.

A dequantization process is a reverse process of the quantization process. In this process, a quantized transform coefficient C may be multiplied by a quantization ratio ($Q_{step}$), and a reconstructed transform coefficient C may be obtained based on the result of the multiplication. In this case, a level scale may be derived based on a quantization parameter, the level scale may be applied to the quantized transform coefficient C', and a reconstructed transform coefficient C may be derived. The reconstructed transform coefficient C may have some difference from the first transform coefficient C due to a loss in the transform and/or quantization process. Accordingly, dequantization is performed in the encoding apparatus as in the decoding apparatus.

Meanwhile, an adaptive frequency weighting quantization technology for adjusting quantization strength depending on a frequency may be applied. The adaptive frequency weighting quantization technology is a method of differently applying quantization strength for each frequency. In the adaptive frequency weighting quantization, quantization strength for each frequency may be differently applied using a predefined quantization scaling matrix. That is, the aforementioned quantization/dequantization process may be performed based on the quantization scaling matrix. For example, in order to generate the size of a current block and/or a residual signal of the current block, a different quantization scaling matrix may be used depending on whether a prediction mode applied to the current block is inter prediction or intra prediction. The quantization scaling matrix may be called a quantization matrix or a scaling matrix. The quantization scaling matrix may be pre-defined. Furthermore, for frequency adaptive scaling, quantization scale information for each frequency for the quantization scaling matrix may be constructed/encoded in the encoding apparatus and signaled to the decoding apparatus. The quantization scale information for each frequency may be called quantization scaling information. The quantization scale information for each frequency may include scaling list data (scaling list data). A (modified) quantization scaling matrix may be derived based on the scaling list data. Furthermore, the quantization scale information for each frequency may include present flag information representing whether the scaling list data is present. Alternatively, if the scaling list data is signaled in a higher level (e.g., SPS), information representing whether the scaling list data is modified in a lower level (e.g., a PPS or a tile group header, etc.) of a higher level, etc. may be further included.

As in the aforementioned contents, quantization/dequantization may be applied to a luma component and a chroma component based on a quantization parameter.

Quantization parameters for a coding unit may be determined based on information signaled in a picture and/or a slice level. For example, the quantization parameters may be derived as in contents described later.

For example, information related to the derivation of quantization parameters may be signaled as in the following table through a sequence parameter set (SPS).

TABLE 1

| | Descriptor |
|---|---|
| seq_parameter_set_rbsp( ) { | |
|   sps_decoding_parameter_set_id | u(4) |
|   ... | |
|   bit_depth_luma_minus8 | uc(v) |
|   bit_depth_chroma_minus8 | ue(v) |
|   ... | |
|   rbsp_trailing_bits( ) | |
| } | |

Semantics for syntax elements in Table 1 may be the same as the following table.

TABLE 2 bit_depth_luma_minus8 specifies the bit depth of the samples of the luma array $BitDepth_Y$
and the value of the luma quantization parameter range offset $QpBdOffset_Y$ as follows:
$BitDepth_Y = 8 + $ bit_depth_luma_minus8
$QpBdOffset_Y = 6 *$ bit_depth_luma_minus8
bit_depth_luma_minus8 shall be in the range of 0 to 8, inclusive.
bit_depth_chroma_minus8 specifies the bit depth of the samples of the chroma arrays
$BitDepth_C$ and the value of the chroma quantization parameter range offset $QpBdOffset_C$ as
follows:
$BitDepth_C = 8 + 30$
bit_depth_chroma_minus8
$QpBdOffset_C = 6 *$ bit_depth_chroma_minus8
bit_depth_chroma_minus8 shall be in the range of 0 to 8, inclusive.

For example, the syntax element bit_depth_luma_minus8 may represent $BitDepth_Y$, that is, the bit depth of samples of a luma array, and $QpBdOffset_Y$ that is a luma quantization parameter range offset. That is, for example, the $BitDepth_Y$ and the $QpBdOffset_Y$ may be derived based on the syntax element bit_depth_luma_minus8. For example, the $BitDepth_Y$ may be derived as a value obtained by adding 8 to a value of the syntax element bit_depth_luma_minus8. The $QpBdOffset_Y$ may be derived as a value obtained by multiplying a value of the syntax element bit_depth_luma_minus8 by 6. Furthermore, the bit_depth_luma_minus8 may be in a range of 0 to 8.

Furthermore, for example, the syntax element bit_depth_chroma_minus8 may represent $BitDepth_C$, that is, the bit depth of samples of a chroma array, and $QpBdOffset_C$, that is, a chroma quantization parameter range offset. That is, for example, the $BitDepth_C$ and the $QpBdOffset_C$ may be derived based on the syntax element bit_depth_chroma_minus8. For example, the $BitDepth_C$ may be derived as a value obtained by adding 8 to a value of the syntax element bit_depth_chroma_minus8. The $QpBdOffset_C$ may be derived as a value obtained by multiplying a value of the syntax element bit_depth_chroma_minus8 by 6. Furthermore, the bit_depth_chroma_minus8 may be in a range of 0 to 8.

Furthermore, information related to the derivation of quantization parameters may be signaled as in the following table, for example, through a picture parameter set (PPS). The information may include a chroma Cb offset, a chroma Cr offset, a joint chroma offset, and an initial quantization parameter. That is, the information may include syntax elements for a chroma Cb offset, a chroma Cr offset, a joint chroma offset, and an initial quantization parameter.

TABLE 3

| | Descriptor |
|---|---|
| pic_parameter_set_rbsp( ) { | |
|   pps_pic_parameter_set_id | ue(v) |
|   ... | |
|   init_qp_minus26 | sc(v) |
|   transform_skip_enabled_flag | u(1) |
|   pps_cb_qp_offset | se(v) |
|   pps_cr_qp_offset | se(v) |
|   pps_joint_cbcr_qp_offset | sc(v) |
|   pps_slice_chroma_qp_offsets_present_flag | u(1) |
|   ... | |
|   rbsp_trailing_bits( ) | |
| } | |

Semantics for syntax elements in Table 3 may be the same as the following table.

TABLE 4 init_qp_minus26 plus 26 specifies the initial value of $SliceQp_Y$ for each slice referring to
the PPS. The initial value of $SliceQp_Y$ is modified at the slice layer when a non-zero value of
slice_qp_delta is decoded. The value of init_qp_minus26 shall be in the range of −
$( 26 + QpBdOffset_Y )$ to +37, inclusive.
pps_cb_qp_offset and pps_cr_qp_offset specify the offsets to the luma quantization
parameter $Qp'_Y$ used for deriving $Qp'_{Cb}$ and $Qp'_{Cr}$, respectively. The values of
pps_cb_qp_offset and pps_cr_qp_offset shall be in the range of −12 to +12, inclusive. When
ChromaArrayType is equal to 0, pps_cb_qp_offset and pps_cr_qp_offset are not used in the
decoding process and decoders shall ignore their value.
pps_joint_cbcr_qp_offset specifies the offset to the luma quantization parameter $Qp'_Y$ used
for deriving $Qp'_{CbCr}$. The value of pps_joint_cbcr_qp_offset shall be in the range of −12 to
+12, inclusive. When ChromaArrayType is equal to 0, pps_joint_cbcr_qp_offset is not used
in the decoding process and decoders shall ignore its value.
pps_slice_chroma_qp_offsets_present_flag equal to 1 indicates that the slice_cb_qp_offset
and slice_cr_qp_offset syntax elements are present in the associated slice headers.
pps_slice_chroma_qp_offsets_present_flag equal to 0 indicates that these syntax elements
are not present in the associated slice headers. When ChromaArrayType is equal to 0,
pps_slice_chroma_qp_offsets_present_flag shall be equal to 0.

For example, a value obtained by adding 26 to the syntax element init_qp_minus26 may represent an initial value of $SliceQp_Y$ for each slice that refers to a PPS. If a non-zero value of slice_qp_delta is decoded, an initial value of the SliceQpY may be modified in a slice layer. The init_qp_minus26 0 may be in a range of $-(26+QpBdOffset_Y)$ to +37.

Furthermore, for example, syntax elements pps_cb_qp_offset and pps_cr_qp_offset may represent offsets for a luma quantization parameter $Qp'_Y$ used to derive $Qp'_{Cb}$ and $Qp'_{Cr}$, respectively. The pps_cb_qp_offset and pps_cr_qp_offset may be in a range of −12 to +12. Furthermore, when ChromaArrayType is 0, in a decoding process, pps_cb_qp_offset and pps_cr_qp_offset may not be used, and the decoding apparatus may ignore values of the syntax elements.

Furthermore, for example, the syntax element pps_joint_cbcr_qp_offset may represent an offset for a luma quantization parameter $Qp'_Y$ used to derive $Qp'_{CbCr}$. The pps_joint_cbcr_qp_offset may be in a range of −12 to +12. Furthermore, when ChromaArrayType is 0, in a decoding process, pps_joint_cbcr_qp_offset may not be used, and the decoding apparatus may ignore a value of the syntax element.

Furthermore, for example, the syntax element pps_slice_chroma_qp_offsets_present_flag may represent whether syntax elements slice_cb_qp_offset and slice_cr_qp_offset are present in slice headers associated with the syntax elements slice_cb_qp_offset and slice_cr_qp_offset. For example, pps_slice_chroma_qp_offsets_present_flag having a value of 1 may represent that the syntax elements slice_cb_qp_offset and slice_cr_qp_offset are present in slice headers associated with the syntax elements slice_cb_qp_offset and slice_cr_qp_offset. Furthermore, for example, pps_slice_chroma_qp_offsets_present_flag having a value of 0 may represent that the syntax elements slice_cb_qp_offset and slice_cr_qp_offset are not present in slice headers associated with the syntax elements slice_cb_qp_offset and slice_cr_qp_offset. Furthermore, when ChromaArrayType is 0, in a decoding process, pps_slice_chroma_qp_offsets_present_flag may be the same as 0.

pps_joint_cbcr_qp_offset may represent offsets for a luma quantization parameter $Qp'_Y$. Furthermore, the syntax element pps_slice_chroma_qp_offsets_present_flag may represent whether an offset parameter is present in a slice header.

Furthermore, information related to the derivation of quantization parameters may be signaled as in the following table through a slice header, for example.

TABLE 5

|  | Descriptor |
|---|---|
| slice_header( ) { | |
|   slice_pic_parameter_set_id | ue(v) |
|   ... | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     slice_joint_cbcr_qp_offset | se(v) |
|   } | |
|   ... | |
|   byte_alignment( ) | |
| } | |

Semantics for syntax elements in Table 5 may be the same as the following table.

TABLE 6 slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice. $SliceQp_Y$, is derived as follows:
$SliceQp_Y = 26 + init\_qp\_minus26 + slice\_qp\_delta$
The value of $SliceQp_Y$ shall be in the range of $-QpBdOffset_Y$ to +63, inclusive.
slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset + slice_cb_qp_offset shall be in the range of −12 to +12, inclusive.
slice_cr_qp_offset specifies a difference to be added to the value of pps_cr_qp_offset when determining the value of the $Qp'_{Cr}$ quantization parameter. The value of slice cr_qp_offset shall be in the range of −12 to +12, inclusive. When slice_cr_qp_offset is not present, it is inferred to be equal to 0. The value of pps_cr_qp_offset + slice_cr_qp_offset shall be in the range of −12 to +12, inclusive,
slice_joint_cbcr_qp_offset specifies a difference to be added to the value of pps_joint cbcr_qp_offset when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset + slice_joint_cbcr_qp_offset shall be in the range of −12 to +12, inclusive.
The derivation process for the luma and chroma quantization parameters begin with the inputs to the process being a luma location, variables specifying the width and height of the current coding block and a variable specifying whether it is a single or a dual tree. The luma, chroma and the joint chroma quantization parameters are dentoted as follows: $Qp'_Y$ $Qp'_{Cb}$ $Qp'_{Cr}$ and $Qp'_{CbCr}$.
cu_qp_delta_sign_flag specifies the sign of CuQpDeltaVal as follows:
If cu_qp_delta_sign_flag is equal to 0, the corresponding CuQpDeltaVal has a positive value.
Otherwise (cu_qp_delta_sign_flag is equal to 1), the corresponding CuQpDeltaVal has a negative value.
When cu_qp_delta_sign_flag is not present, it is inferred to be equal to 0.
When cu_qp_delta_abs is present, the variables IsCuQpDeltaCoded and CuQpDeltaVal are derived as follows:
IsCuQpDeltaCoded = 1
CuQpDeltaVal = cu_qp_delta_abs * (1 − 2 * cu_qp_delta_sign_flag )
The value of CuQpDeltaVal shall be in the range of −( 32 + QpBdOffsetY/2 ) to +( 31 + QpBdOffsetY/2 ), inclusive.

As in the aforementioned contents, syntax elements parsed in the PPS may be init_qp_minus26, pps_cb_qp_offset_pps_cr_qp_offset, pps_joint_cbcr_qp_offset, and pps_slice_chroma_qp_offsets_present_flag. A syntax element init_qp_minus26 may represent an initial value of $SliceQp_Y$ for each slice that refers to a PPS. Furthermore, syntax elements pps_cb_qp_offset, pps_cr_qp_offset, and For example, slice_qp_delta may represent an initial value of $Qp_Y$ to be used in a coding block within a slice until it is modified by a value of CuQpDeltaVal in a coding unit layer. For example, an initial value of $Qp_Y$ for a slice, $SliceQp_Y$, may be derived as 26+init_qp_minus26+slice_qp_delta. A value of $SliceQp_Y$ may be in a range of −$QpBdOffset_Y$ to +63.

Furthermore, for example, slice_cb_qp_offset may represent a difference to be added to a value of pps_cb_qp_offset when a value of the quantization parameter Qp'$_{Cb}$ is determined. A value of slice_cb_qp_offset may be in a range of −12 to +12. Furthermore, for example, if slice_cb_qp_offset is not present, the slice_cb_qp_offset may be inferred as 0. A value of pps_cb_qp_offset+slice_cb_qp_offset may be in a range of 12 to +12.

Furthermore, for example, slice_cr_qp_offset may represent a difference to be added to a value of pps_cr_qp_offset when a value of a quantization parameter Qp'$_{Cr}$ is determined. A value of slice_cr_qp_offset may be in a range of −12 to +12. Furthermore, for example, if slice_cr_qp_offset is not present, the slice_cr_qp_offset may be inferred as 0. A value of pps_cr_qp_offset+slice_cr_qp_offset may be in a range of 12 to +12.

Furthermore, for example, slice_cbcr_qp_offset may represent a difference to be added to a value of pps_cbcr_qp_offset when a value of a quantization parameter Qp'$_{CbCr}$ is determined. A value of slice_cbcr_qp_offset may be in a range of −12 to +12. Furthermore, for example, if slice_cbcr_qp_offset is not present, the slice_cbcr_qp_offset may be inferred as 0. A value of pps_cbcr_qp_offset+slice_cbcr_qp_offset may be in a range of 12 to +12.

A derivation process for luma and chroma quantization parameters may be started based on the fact that an input for the process is a luma location, a parameter to designate the width and height of a current coding block, and a parameter to designate a single tree or a dual tree. Meanwhile, as in the aforementioned contents, a luma quantization parameter, a chroma quantization parameter and a joint chroma quantization parameter may be represented as Qp'$_Y$, Qp'$_{Cb}$, Qp'$_{Cr}$ and Qp'$_{CbCr}$.

Meanwhile, for example, the syntax element cu_qp_delta_sign_flag representing a sign of CuQpDeltaVal may be parsed. For example, the cu_qp_delta_sign_flag may represent the sign of CuQpDeltaVal as follows.

For example, when the cu_qp_delta_sign_flag is 0, CuQpDeltaVal corresponding to the cu_qp_delta_sign_flag may have a positive value. Alternatively, for example, when the cu_qp_delta_sign_flag is 1, CuQpDeltaVal corresponding to the cu_qp_delta_sign_flag may have a negative value. Furthermore, if the cu_qp_delta_sign_flag is not present, the cu_qp_delta_sign_flag may be inferred as 0.

Furthermore, for example, if cu_qp_delta_abs is present, a parameter IsCuQpDeltaCoded may be derived as 1. A parameter CuQpDeltaVal may be derived as cu_qp_delta_abs*(1−2*cu_qp_delta_sign_flag). The CuQpDeltaVal may be in a range of −(32+QpBdOffsetY/2) to +(31+QpBdOffsetY/2).

Thereafter, for example, the luma quantization parameter Qp'$_Y$ may be derived as in the following equation.

$$Qp_Y = ((qP_{Y\_PRED} + CuQpDeltaVal + 64 + 2*QpBdOffset_Y)\%(64+QpBdOffset_Y)) - QpBdOffset_Y \quad \text{[Equation 1]}$$

Furthermore, if ChromaArrayType is not 0 and, treeType is SINGLE_TREE or DUAL_TREE_CHROMA, the following may be applied.

When treeType is equal to DUAL_TREE_CHROMA, a parameter Qp$_Y$ may be set identically with a luma quantization parameter Qp$_Y$ of a luma coding unit including a luma location (xCb+cbWidth/2, yCb+cbHeight/2).

Parameters qP$_{Cb}$, qP$_{Cr}$ and qP$_{CbCr}$ may be derived as follows.

$$qPi_{Cb} = \text{Clip3}(-QpBdOffset_C, 69, \quad \text{[Equation 2]}$$
$$Qp_Y + \text{pps\_cb\_qp\_offset} + \text{slice\_cb\_qp\_offset})$$
$$qPi_{Cr} = \text{Clip3}(-QpBdOffset_C, 69,$$
$$Qp_Y + \text{pps\_cr\_qp\_offset} + \text{slice\_cr\_qp\_offset})$$
$$qPi_{CbCr} = \text{Clip3}(-QpBdOffset_C, 69,$$
$$Qp_Y + \text{pps\_joint\_cbcr\_qp\_offset} +$$
$$\text{slice\_joint\_cbcr\_qp\_offset})$$

For example, when ChromaArrayType is 1, parameters qP$_{Cb}$, qP$_{Cr}$ and qP$_{CbCr}$ may be set identically with a QpC value designated in Table 7 based on the same indices qPi as qPi$_{Cb}$, qPi$_{Cr}$ and qPi$_{CbCr}$, respectively.

TABLE 7

| | qPi | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| Qp$_C$ | =qPi | 29 | 30 | 31 | 32 | 33 | 33 | 34 | 34 | 35 | 35 | 36 | 36 | 37 | 37 | =qPi − 6 |

Alternatively, when ChromaArrayType is not 1, the parameters qP$_{Cb}$, qP$_{Cr}$, and qP$_{CbCr}$ may be set identically with Min (qPi, 63) based on the same indices qPi as qPi$_{Cb}$, qPi$_{Cr}$, and qPi$_{CbC}$, respectively.

Chroma quantization parameters for a Cb component and a Cr component, Qp'$_{Cb}$ and Qp'$_{Cr}$, and a chroma quantization parameter Qp'$_{CbCr}$ for joint Cb-Cr coding may be derived as follows.

$$Qp'_{Cb} = qP_{Cb} + QpBdOffset_C \quad \text{[Equation 3]}$$
$$Qp'_{Cr} = qP_{Cr} + QpBdOffset_C$$
$$Qp'_{CbCr} = qP_{CbCr} + QpBdOffset_C$$

Meanwhile, this document proposes schemes for improving coding efficiency in a quantization/dequantization process.

In an embodiment, this document proposes a method of defining and using a user defined chroma quantization mapping table, not a method of obtaining a chroma quantization parameter value from a luma quantization parameter value through a chroma quantization mapping table predefined in the existing VVC Draft5 v.7 when ChromaArrayType is not 0 (e.g., when ChromaArrayType is 1). In the VVC specification text (e.g., VVC Draft5 v.7), when qPi (a luma quantization parameter value) is given, Qpc (chroma quantization parameter value) is derived through the predefined chroma quantization table (e.g., Table 7), but this document proposes a method of deriving Qpc from qPi based on a chroma quantization mapping table newly defined by a user. According to an embodiment of this document, there is proposed a method in which a Qpc value may be derived through a function relation of a qPi value, a function may be signaled as a syntax, such as an APS, an SPS or a PPS, through a user defined functionality method, which includes the function relation transmit values of predefined syntax elements, and a user defines chroma quantization table mapping based on the transmitted values. For example, since a Qpc value can be derived through the function relation of the qPi value, if syntax element values representing a corresponding function are transmitted, a user defined chroma quantization mapping table may be derived in a form, such as Table 7.

In an embodiment, there is proposed a scheme for signaling information about syntax elements (Qpc_data) representing chroma quantization mapping-related function as in the following table to be described later in an adaptation parameter set (APS).

TABLE 8

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data(adaptation_parameter_set_id ) | |
|   else if ( aps_params_type = = LMCS_APS ) | |
|     lmcs_data( ) | |
|   else if ( aps_params_type = = Qpc_APS ) // 2 | |
|     Qpc_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

Referring to Table 8, if the aps_params_type represents Qpc_APS, for example, when a value of the aps_params_type is 2, Qpc_data( ) may be signaled.

Semantics for syntax elements in Table 8 may be the same as the following table.

TABLE 9 adaptation_parameter_set_id provides an identifier for the APS for reference by other syntax elements.
NOTE - APSs can be shared across pictures and can be different in different slices within a picture.
aps_extension_flag_equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.
aps_extension_data_flag may have any value. Its presence and value do not affect decoder conformance to profiles specified in this version of this Specification. Decoders conforming to this version of this Specification shall ignore all aps_extension_data_flag syntax elements.
aps_params_type specifies the type of APS parameters carried in the APS as specified in the Table 2 shown below.

For example, the syntax element adaptation_parameter_set_id may provide an identifier of an APS referred by other syntax elements.

Furthermore, for example, the syntax element aps_extension_flag may represent whether aps_extension_data_flag syntax elements are present in an APS RBSP syntax structure. For example, the syntax element aps_extension_flag having a value of 1 may represent that the aps_extension_ data_flag syntax elements are present in the APS RBSP syntax structure. The syntax element aps_extension_flag having a value of 0 may represent that the aps_extension_ data_flag syntax elements are not present in the APS RBSP syntax structure.

Furthermore, for example, the syntax element aps_extension_data_flag may have any value. The presence (presence and value) of the aps_extension_data_flag may not affect decoding suitability for a profile specified in a version of this standard. For example, a decoding apparatus that follows a version of this standard may ignore all syntax elements aps_extension_data_flag.

Furthermore, for example, the syntax element aps_params_type may represent the type of APS parameters included in an APS as illustrated in Table 10.

TABLE 10

| aps_params_type | Name of aps_params_type | Type of APS parameters |
|---|---|---|
| 0 | ALF_APS | ALF parameters |
| 1 | LMCS_APS | LMCS parameters |
| 2 | QPc_APS | Qpc data parameters |
| 3 . . . 7 | Reserved | Reserved |

For example, referring to Table 10, when a value of the syntax element aps_params_type is 0, the syntax element aps_params_type may represent that the type of APS parameters is ALF parameters. When a value of the syntax element aps_params_type is 1, the syntax element aps_params_type may represent that the type of APS parameters is LMCS parameters. When a value of the syntax element aps_params_type is 2, the syntax element aps_params_type may represent that the type of APS parameters is Qpc data parameters. The Qpc data parameter may represent a chroma quantization data parameter.

Furthermore, this document proposes another embodiment in which information for a quantization parameter is signaled.

For example, the present embodiment proposes a scheme for signaling user defined $Qp_C$ data in a picture parameter set (PPS). As an example for performing a scheme proposed in the present embodiment, a flag representing whether a PPS includes user defined data in an SPS may be introduced. That is, a flag representing whether a PPS includes user defined data in an SPS, may be signaled. Furthermore, according to the present embodiment, user defined data may be signaled in a PPS. Alternatively, user defined data may be signaled in a slice header and/or another header set.

The flag representing whether a PPS includes user defined data may be signaled as in the following table.

TABLE 11

| | Descriptor |
|---|---|
| seq_parameter_set_rbsp( ) { | |
|    sps_decoding_parameter_set_id | u(4) |
|    ... | |
|    Qpc_data_default_flag | u(1) |
|    ... | |
|    rbsp_trailing_bits( ) | |
| } | |

For example, the syntax element Qpc_data_default_flag may be a syntax element of the aforementioned flag. The syntax element Qpc_data_default_flag may represent whether Qpc_data( ) parameters are present in a PPS RBSP syntax structure. For example, Qpc_data_default_flag of 0 may represent that Qpc_data( ) parameters are not present in the PPS RBSP syntax structure and a default table is used to help a determination of chroma quantization. In this case, the default table may be the same as Table 7. Furthermore, for example, Qpc_data_default_flag of 1 may represent that Qpc_data( ) parameters may be present in the PPS RBSP syntax structure.

Furthermore, user defined data signaled in a PPS according to the present embodiment may be the same as the following table.

TABLE 12

| | Descriptor |
|---|---|
| pic_parameter_set_rbsp( ) { | |
|    pps_pic_parameter_set_id | ue(v) |
|    ... | |
|    if(Qpc_data_default_flag) | |
|      Qpc_data( ) | |
|    ... | |
|    rbsp_trailing_bits( ) | |
| } | |

Meanwhile, for example, Qpc_data( ) may include information necessary for chroma quantization derivation when ChromaArrayType is 1.

Furthermore, this document proposes another embodiment in which information for a quantization parameter is signaled.

For example, the present embodiment proposes a flexible structure for chroma quantization parameter (QP) derivation and combined chroma QP derivation. The present embodiment proposes a scheme for signaling an initial flag representing whether a user defined mode in which parameters representing a function used to derive a chroma quantization parameter (QP) in an SPS and/or a PPS may be used is present.

For example, flag information signaled in a high level syntax proposed in the present embodiment may be the same as a table to be described later.

TABLE 13

| | Descriptor |
|---|---|
| high_level_syntax_parameter_set { | |
|    ... | |
|    Qpc_data_present_flag | u(1) |
|    ... | |
| } | |

For example, Qpc_data_present_flag may represent whether parameters for deriving a chroma quantization parameter are present in a high level syntax RBSP syntax structure. For example, Qpc_data_present_flag having a value of 0 may represent that chroma quantization parameters are not present in a high level syntax RBSP syntax structure. Furthermore, for example, Qpc_data_present_flag having a value of 1 may represent that chroma quantization parameters are present in a high level syntax RBSP syntax structure.

Alternatively, the syntax element Qpc_data_present_flag may be used to indicate a scheme of using chroma quantization derivation in a bitstream. For example, the syntax element Qpc_data_present_flag may represent a tool used for chroma quantization derivation or the use of a user defined mode as follows.

For example, Qpc_data_present_flag may represent whether user defined chroma quantization is used in a bitstream. For example, Qpc_data_present_flag having a value of 0 may represent that user defined chroma quantization is not used in a bitstream. Furthermore, for example, Qpc_data_present_flag having a value of 1 may represent that user defined chroma quantization is used solely or along with another flag.

Furthermore, this document proposes another embodiment in which information for a quantization parameter is signaled.

For example, the present embodiment proposes an embodiment in which how chroma quantization parameters (QP), that is, $Qp'_{Cb}$, $Qp'_{Cr}$ and $Qp'_{CbCr}$ can be derived using user defined information signaled in one function. For example, according to the present embodiment, data representing a function for deriving a chroma quantization parameter (QP) may be signaled, and chroma quantization parameters may be derived based on chroma quantization data. Data (or user defined QP mapping table) for chroma quantization parameter derivation may be signaled as in the following table.

TABLE 14

| | Descriptor |
|---|---|
| $Qp_C$_data( ) { | |
|    qPi_min_idx | ue(v) |
|    qPi_delta_max_idx | ue(v) |
|    for ( i = qPi_min_idx; i <= qPiMaxIdx; i++ ) | |
|      QpC_qPi_val[ i ] | ue(v) |
|    QpOffsetC | ue(v) |
| } | |

Semantics for syntax elements in Table 14 may be the same as the following table.

TABLE 15 qPi_min_idx specifies the minimum qPi index used in the chroma quantization.
qPi_delta_max_idx specifies the delta value between the $Qp_C$_min_idx and the maximum
qPi index used for the chroma $Qp_C$ derivation. The value of qPiMaxIdx shall be greater than
or equal to qPi_min_idx. The maximum index qPiMaxIdx used in $Qp_C$ derivation is derived
as follows:
qPiMaxIdx = qPi_min_idx + qPi_delta_max_idx
$Qp_C$_qPi_val[i] specifies the $Qp_C$ value for the $i^{th}$ index.
QpOffset$_C$ specifies the offset value to be used the derivation of the $Qp_C$.
The variable $Qp_C$Idx[ qPi ] for qPi with qPi = 0 ... qPiMaxIdx, is derived as follows:
For qPi < qPi_min_idx, $Qp_C$Idx[qPi ] is set equal to qPi.
For qPi = qPi_min_idx ... qPiMaxIdx, the following applies:
$Qp_C$Idx[ qPi ] = $Qp_C$_qPi_val[ qPi ]
For qPi > qPiMaxIdx, $Qp_C$Idx[ qPi ] = qPi-QpOffset$_C$
The value of $Qp_C$ is derived as $Qp_C$Idx[qPi].

For example, the syntax element qPi_min_idx may represent a minimum qPi index used in chroma quantization.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. For example, a maximum index qPiMaxIdx used in $Qp_c$ derivation may be derived as in the following equation.

$$qPi\text{MaxIdx} = qPi\_min\_idx + qPi\_delta\_max\_idx \quad \text{[Equation 4]}$$

Furthermore, for example, the syntax element $Qp_C$_qPi_val[i] may represent a $Qp_C$ value for an i-th index.

Furthermore, for example, the syntax element QpOffset$_C$ may represent an offset value used for the derivation of $Qp_C$.

Furthermore, for example, a parameter $Qp_C$Idx[qPi] for qPi may be derived as follows. In this case, the qPi may be 0 to qPiMaxIdx.

When qPi<qPi_min_idx, $Qp_C$Idx[qPi] may be set identically with qPi.

When qPi=qPi_min_idx ... qPiMaxIdx, $Qp_C$Idx[qPi] may be set identically with $Qp_C$_qPi_val[qPi].

When qPi>qPiMaxIdx, $Qp_C$Idx[qPi] may be set as qPi-QpOffset$_C$.

Thereafter, a value of $Qp_C$ may be derived as $Qp_C$Idx[qPi].

For example, according to the present embodiment, if a process of deriving a quantization parameter is described in a standard format, the process may be represented as in the following table.

TABLE 16

Derivation process for quantization parameters

Inputs to this process are:
a luma location ( xCb, yCb ) specifying the top-left luma sample of the current coding block
relative to the top-left luma sample of the current picture,
a variable cbWidth specifying the width of the current coding block in luma samples,
a variable cbHeight specifying the height of the current coding block in luma samples,
a variable treeType specifying whether a single tree (SINGLE_TREE) or a dual tree is used
to partition the CTUs and, when a dual tree is used, whether the luma
(DUAL_TREE_LUMA) or chroma components (DUAL_TREE_CHROMA)
are currently processed.
In this process, the luma quantization parameter $Qp'_Y$ and the chroma quantization
parameters $Qp'_{Cb}$ and $Qp'_{Cr}$ are derived.
The luma location ( xQg, yQg ), specifies the top-left luma sample of the current quantization
group relative to the top left luma sample of the current picture. The horizontal and vertical
positions xQg and yQg are set equal to CuQgTopLeftX and CuQgTopLeftY, respectively.
NOTE-: The current quantization group is a rectangluar region inside a coding tree block
that shares the same $qP_{Y\_PRED}$. Its width and height are equal to the width and height of the
coding tree node of which the top-left luma sample position is assigned to the variables
CuQgTopLeftX and CuQgTopLeftY.
When treeType is equal to SINGLE_TREE or DUAL_TREE_LUMA, the predicted luma
quantization parameter $qP_{Y\_PRED}$ is derived by the following ordered steps:
1. The variable $qP_{Y\_PREV}$ is derived as follows:
If one or more of the following conditions are true, $qP_{Y\_PREV}$ is set equal to
SliceQpy:
The current quantization group is the first quantization group in a slice.
The current quantization group is the first quantization group in a brick.
Otherwise, $qP_{Y\_PREV}$ is set
2. The availability derivation process for a block as specified in clause 6.4.X [Ed. (BB):
Neighbouring blocks availability checking process tbd] is invoked with the location
( xCurr, yCurr ) set equal to ( xCb, yCb ) and the neighbouring location
( xNbY, yNbY ) set equal to ( xQg − 1, yQg ) as inputs, and the output is assigned to
availableA. The variable $qP_{Y\_A}$ is derived as follows:
If one or more of the following conditions are true, $qP_{Y\_A}$ is set equal to 0 $P_{Y\_PREV}$:
availableA is equal to FALSE.
the CTB address ctbAddrA of the CTB containing the luma coding block
covering the luma location ( xQg − 1, yQg ) is not equal to CtbAddrInBs,
where ctbAddrA is derived as follows:
xTmp = ( xQg − 1) >> MinTbLog2SizeY
yTmp = yQg >> MinTbLog2SizeY
minTbAddrA = MinTbAddrZs[ xTmp ][ yTmp ]

TABLE 16-continued

Derivation process for quantization parameters ctbAddrA = minTbAddrA >> ( 2 * ( CtbLog2SizeY − MinTbLog2SizeY ) )
Otherwise, $qP_{Y\_A}$ is set equal to the luma quantization parameter QpY of the
coding unit containing the luma coding block covering ( xQg −1, yQg ).
3. The availability derivation process for a block as specified in clause 6.4.X [Ed. (BB):
Neighbouring blocks availability checking process tbd] is invoked with the location
( xCurr, yCurr ) set equal to ( xCb, yCb ) and the neighbouring location
( xNbY, yNbY ) set equal to (xQg, yQg −1) as inputs, and the output is assigned to
availableB. The variable $qP_{Y\_B}$ is derived as follows:
If one or more of the following conditions are true, $qP_{Y\_B}$ is set equal to $qP_{Y\_PREV}$:
availableB is equal to FALSE.
the CTB address ctbAddrB of the CTB containing the luma coding block
covering the luma location ( xQg, yQg −1 ) is not equal to CtbAddrInBs,
where ctbAddrB is derived as follows:
xTmp = xQg >> MinTbLog2SizeY
yTmp = ( yQg −1) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) ) (8-922)
Otherwise, $qP_{Y\_B}$ is set equal to the luma quantization parameter $Qp_Y$ of the
coding unit containing the luma coding block covering ( xQg, yQg − 1 ).
4. The predicted luma quantization parameter $qP_{Y\_PRED}$ is derived as follows:
If an the following conditions are true, then $qP_{Y\_PRED}$ is set equal to the luma
quantization parameter $Qp_Y$ of the coding unit containing the luma coding block
covering ( xQg, yQg − 1):
availableB is equal to TRUE.
the current quantization group is the first quantization group in a CTB row
within a brick
Otherwise, $qP_{Y\_PRED}$ is derived as follows:
$qP_{Y\_PRED}$ ( $qP_{Y\_A}$ + $qP_{Y\_B}$ + 1) >> 1
The variable $QP_Y$ is derived as follows:
$QP_Y$ =
( ( $qP_{Y\_PRED}$ + CuQpDeltaVal + 64 + 2 * $QpBdOffset_Y$ )%( 64 + $QpBdOffset_Y$ ) ) −Qp
$BdOffset_Y$
The luma quantization parameter $Qp'_Y$ is derived as follows:
$Qp'_Y$ = $Qp_Y$ + $QpBdOffset_Y$
When ChromaArrayType is not equal to 0 and treeType is equal to SINGLE_TREE or
DUAL_TREE_CHROMA, the following applies:
When treeType is equal to DUAL_TREE_CHROMA, the variable $Qp_Y$ is set equal to the
luma quantization parameter $Qp_Y$ of the luma coding unit that covers the luma location
( xCb + cbWidth/2, yCb + cbHeight/2).
The variables $qP_{Cb}$, $qP_{Cr}$ and $qP_{CbCr}$ are derived as follows:
$qPi_{Cb}$ = Clip3( −$QpBdOffset_C$, 69, $Qp_Y$ + pps_cb_qp_offset + slice cb_qp offset )
$qPi_{Cr}$ = Clip3( −$QpBdOffset_C$, 69, $Qp_Y$ + pps_cr_qp_offset + slice_cr_qp_offset )
$qPi_{CbCr}$ = Clip3( −$QpBdOffset_C$, 69, $Qp_Y$ + pps_joint_cbcr_qp offset + slice_joint_c
bcr_qp_offset )
If ChromaArrayType is equal to 1, the variables $qP_{Cb}$, $qP_{Cr}$ and $qP_{CbCr}$ are
set equal to the value of $Qp_C$ as specified in-Table 8-15 based on the index qPi equal to
$qPi_{Cb}$, $qPi_{Cr}$ and $qPi_{CbCr}$, respectively clause 7 .x.x
Otherwise, the variables $qP_{Cb}$, $qP_{Cr}$ and $qP_{CbCr}$ are set equal to Min( qPi, 63), based on the
index qPi equal to $qP_{Cb}$, $qP_{Cr}$ and $qP_{CbCr}$, respectively.
The chroma quantization parameters for the Cb and Cr components, $Qp'_{Cb}$ and $Qp'_{Cr}$, and
joint Cb-Cr coding $Qp'_{CbCr}$ are derived as follows:
$Qp'_{Cb}$ = $qP_{Cb}$ + $QpBdOffset_C$
$Qp'_{Cr}$ = $qP_{Cr}$ + $QpBdOffset_C$
$Qp'_{CbCr}$ = $qP_{CbCr}$ + $QpBdOffset_C$ Referring to Table 16, a derivation process for luma and chroma quantization parameter may be started based on the fact that an input for the process is a luma location (xCb, yCb), a parameter cbWidth and cbHeight designating the width and height of a current coding block, and a parameter treeType designating a single tree or a dual tree. Meanwhile, as in the aforementioned contents, a luma quantization parameter and a chroma quantization parameter may be represented as $Qp'_Y$, $Qp'_{Cb}$ and $Qp'_{Cr}$.

Furthermore, this document proposes another embodiment in which information for a quantization parameter is signaled.

For example, the present embodiment proposes an example in which a flag within as an SPS has a user defined mode or a default mode, syntax elements which may be used to control the derivation of a quantization parameter are used. An example of a syntax element which may be used to derive a quantization parameter may be the same as the following tables. Meanwhile, a structure of the syntax elements is not limited to a structure illustrated in the following tables, for example.

TABLE 17

|  | Descriptor |
|---|---|
| pic_parameter_set_rbsp( ) { |  |
|    pps_pic_parameter_set_id | ue(v) |
|    ... |  |
|    Qpc_data_default_flag | u(1) |
|    ... |  |

TABLE 18

| | Descriptor |
|---|---|
| slice_header( ) { | |
|   slice_pic_parameter_set_id | ue(v) |
|   ... | |
|   if(!Qpc_data_default_flag ) | |
|     slice_Qp$_C$_aps_id | u(5) |
|   byte_alignment( ) | |
| } | |

TABLE 19

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data(adaptation_parameter_set_id ) | |
|   else if( aps_params_type = = LMCS_APS ) | |
|     lmcs_data( ) | |
|   else if ( aps_params_type = = Qpc_APS ) // 2 | |
|     Qp$_C$_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

For example, the syntax element Qpc_data_default_flag may represent whether a user defined mode is used for the derivation of a quantization parameter. For example, Qpc_data_default_flag having a value of 0 may represent that the user defined mode is used for the derivation of a quantization parameter. Furthermore, for example, Qpc_data_default_flag having a value of 1 may represent that a default table is used for the derivation of a chroma quantization parameter. In this case, the default table may be the same as Table 7. Furthermore, if the syntax element Qpc_data_default_flag is not present, the syntax element Qpc_data_default_flag may be inferred as 1.

Meanwhile, if the user defined mode is used, a corresponding slice header, tile group/header, or another proper header may be used to signal an APS ID. For example, as in Table 18, a syntax element representing an APS ID through a slice header may be signaled.

For example, the syntax element slice_Qpc_aps_id may represent adaptation_parameter_set_id of a Qpc_APS referred to by a slice. TemporalId of a Qpc_APS NAL unit having adaptation_parameter_set_id, such as slice_Qpc_aps_id, may be smaller than or equal to TemporalId of a coded slice NAL unit. If a plurality of Qp$_c$ APSs having adaptation_parameter_set_id having the same value is referred to by two or more slices of the same picture, a plurality of Qp$_c$ APSs having adaptation_parameter_set_id having the same value may have the same content.

Furthermore, an APS structure that transfers chroma quantization data, which is proposed in the present embodiment, may be the same as Table 19.

For example, the syntax element adaptation_parameter_set_id may provide an identifier of an APS referred to by other syntax elements.

Furthermore, for example, the syntax element aps_extension_flag may represent whether aps_extension_data_flag syntax elements are present in an APS RBSP syntax structure. For example, the syntax element aps_extension_flag having a value of 1 may represent that the aps_extension_data_flag syntax elements are present in an APS RBSP syntax structure. The syntax element aps_extension_flag having a value of 0 may represent that the aps_extension_data_flag syntax elements are not present in an APS RBSP syntax structure.

Furthermore, for example, the syntax element aps_extension_data_flag may have any value. The presence (presence and value) of the aps_extension_data_flag may not affect decoding suitability for a profile specified in a version of this standard. For example, the decoding apparatus following a version of this standard may ignore all of the syntax elements aps_extension_data_flag.

Furthermore, for example, the syntax element aps_params_type may represent the type of APS parameters included in an APS as illustrated in Table 10.

Qpc_data( ) disclosed in Table 19 may be signaled as in the following table.

TABLE 20

| | Descriptor |
|---|---|
| Qp$_C$_data ( ) { | |
|   qPi_min_idx | ue(v) |
|   qPi_delta_max_idx | ue(v) |
|   Qp$_C$_prec_minus1 | ue(v) |
|   Qp$_C$_init_val | ue(v) |
|   for ( i = qPi_min idx + 1, i <= qPiMaxIdx; i++) | |
|     Qp$_C$_qPi_delta_val[ i ] | ue(v) |
|   QpOffset$_C$ | ue(v) |
| } | |

For example, the syntax element qPi_min_idx may represent a minimum qPi index used in chroma quantization.

Furthermore, for example, the syntax element qPi_delta_max_idx may represent a delta value between Qpi_min_idx and a maximum qPi index used in chroma Qp$_c$ derivation. A value of qPiMaxIdx may be greater than or equal to qPi_min_idx. For example, a maximum index qPiMaxIdx used in Qp$_c$ derivation may be derived like Equation 4.

Furthermore, for example, a value obtained by adding 1 to the syntax element Qp$_c$_prec_minus1 may represent the number of bits used for the representation of the syntax lmcs_delta_abs_cw[i]. A value of Qp$_c$_prec_minus1 may be in a range of 0 to BitDepth$_Y$−2.

Furthermore, for example, the syntax element Qp$_c$_init_val may represent a Qp$_c$ value corresponding to qPi_min_idx.

Furthermore, for example, the syntax element Qp$_C$_qPi_delta_val[i] may represent the delta of a Qp$_C$ value for an i-th index.

Furthermore, for example, the syntax element QpOffset$_C$ may represent an offset value used for the derivation of Qp$_c$.

For example, a parameter Qp$_C$Idx[qPi] for qPi may be derived as follows. In this case, the qPi may be 0 to qPiMaxIdx.

When qPi<qPi_min_idx, Qp$_C$Idx[qPi] may be set identically with qPi.

When qPi=qPi_min_idx . . . qPiMaxIdx, Qp$_C$Idx[qPi] may be set as Qp$_C$_qPi_delta_val[qPi]+Qp$_C$Idx[qPi−1].

When qPi>qPiMaxIdx, Qp$_C$Idx[qPi] may be set as qPi−QpOffset$_C$.

Thereafter, a value of Qp$_C$ may be derived as Qp$_C$Idx[qPi].

As in the aforementioned embodiment, a chroma quantization parameter, that is, Qp'Cb, Qp'Cr, and Qp'CbCr, may be derived using signaled user defined information or a default value illustrated in a default table, such as Table 7.

For example, in the present embodiment, if a process of deriving a quantization parameter is written in a standard format, the process may be represented as in the following table.

TABLE 21

Derivation process for quantization parameters

Inputs to this process are:
a luma location ( xCb, yCb ) specifying the top-left luma sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.
In this process, the luma quantization parameter $Qp'_Y$ and the chroma quantization parameters $Qp'_{Cb}$ and $Qp'_{Cr}$ are derived.
The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.
NOTE - : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.
When treeType is equal to SINGLE_TREE or DUAL_TREE_LUMA, the predicted luma quantization parameter $qP_{Y\_PRED}$ is derived by the following ordered steps:
1. The variable $qP_{Y\_PREV}$ is derived as follows:
If one or more of the following conditions are true, $qP_{Y\_PREV}$ is set equal to SliceQpy:
The current quantization group is the first quantization group in a slice.
The current quantization group is the first quantization group in a brick.
Otherwise, $qP_{Y\_PREV}$ is set
2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
If one or more of the following conditions are true, $qP_{Y\_A}$ is set equal to 0 $P_{Y\_PREV}$ :
availableA is equal to FALSE.
the CTB address ctbAddrA of the CTB containing the luma coding block covering the luma location ( xQg − 1, yQg ) is not equal to CtbAddrInBs, where ctbAddrA is derived as follows:
xTmp = ( xQg − 1) >> MinTbLog2SizeY
yTmp = yQg >> MinTbLog2SizeY
minTbAddrA = MinTbAddrZs[ xTmp ][ yTmp ]
ctbAddrA = minTbAddrA >> ( 2 * ( CtbLog2SizeY − MinTbLog2SizeY ) )
Otherwise, $qP_{Y\_A}$ is set equal to the luma quantization parameter QpY of the coding unit containing the luma coding block covering ( xQg − 1, yQg ).
3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to (xQg, yQg − 1 ) as inputs, and the output is assigned to availableB. The variable $qP_{y\_B}$ is derived as follows:
If one or more of the following conditions are true, $qP_{Y\_B}$ is set equal to $qP_{Y\_PREV}$:
availableB is equal to FALSE.
the CTB address ctbAddrB of the CTB containing the luma coding block covering the luma location ( xQg, yQg − 1 ) is not equal to CtbAddrInBs, where ctbAddrB is derived as follows:
xTmp = xQg >> MinTbLog2SizeY
yTmp = ( yQg − 1) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) ) (8-922)
Otherwise, $qP_{Y\_B}$ is set equal to the luma quantization parameter $Qp_Y$ of the coding unit containing the luma coding block covering ( xQg, yQg − 1 ).
4. The predicted luma quantization parameter $qP_{Y\_PRED}$ is derived as follows:
If an the following conditions are true, then $qP_{Y\_PRED}$ is set equal to the luma quantization parameter $Qp_Y$ of the coding unit containing the luma coding block covering ( xQg, yQg − 1):
availableB is equal to TRUE.
the current quantization group is the first quantization group in a CTB row within a brick
Otherwise, $qP_{Y\_PRED}$ is derived as follows:
$qP_{Y\_PRED}$ ( $qP_{Y\_A}$ + $qP_{Y\_B}$ + 1) >> 1
The variable $QP_Y$ is derived as follows:
$QP_Y$ =
( ( $qP_{Y\_PRED}$ + CuQpDeltaVal + 64 + 2 * $QpBdOffset_Y$ )%( 64 + $QpBdOffset_Y$ ) ) −$QpBdOffset_Y$ TABLE 21-continued Derivation process for quantization parameters The luma quantization parameter $Qp'_Y$ is derived as follows:
$Qp'_Y = Qp_Y + QpBdOffset_Y$
When ChromaArrayType is not equal to 0 and treeType is equal to SINGLE_TREE or
DUAL_TREE_CHROMA, the following applies:
When treeType is equal to DUAL_TREE_CHROMA, the variable $Qp_Y$ is set equal to the
luma quantization parameter $Qp_Y$ of the luma coding unit that covers the luma location
( xCb + cbWidth/2, yCb + cbHeight/2).
The variables $qP_{Cb}$, $qP_{Cr}$ and $qP_{CbCr}$ are derived as follows:
$qPi_{Cb}$ = Clip3( $-QpBdOffset_C$, 69, $Qp_Y$ + pps_cb_qp_offset + slice_cb_qp_offset )
$qPi_{Cr}$ = Clip3( $-QpBdOffset_C$, 69, $Qp_Y$ + pps_cr_qp_offset + slice_cr_qp_offset )
$qPi_{CbCr}$ = Clip3( $-QpBdOffset_C$, 69, $Qp_Y$ + pps_joint_cbcr_qp offset + slice_joint_c
bcr_qp_offset )
If ChromaArrayType is equal to 1, and Qpc_data_default_flag is equal to FALSE,
the variables $qP_{Cb}$, $qP_{Cr}$ and $qP_{CbCr}$ are set equal to the value of $Qp_C$ as specified in
clause 7 .x.x
If ChromaArrayType is equal to 1, and Qpc_data_default_flag is equal to TRUE,
the variables $qP_{Cb}$, $qP_{Cr}$ and $qP_{CbCr}$ are specified in Table 8-15 based on the index qPi
equal to $qPi_{Cb}$, $qPi_{Cr}$ and $qPi_{CbCr}$, respectively
Otherwise, the variables $qP_{Cb}$, $qP_{Cr}$ and $qP_{CbCr}$, are set equal to Min( qPi, 63), based on the
index qPi equal to $qP_{Cb}$, $qP_{Cr}$ and $qP_{CbCr}$, respectively.
The chroma quantization parameters for the Cb and Cr components, $Qp'_{Cb}$ and $Qp'_{Cr}$, and
joint Cb-Cr coding $Qp'_{CbCr}$ are derived as follows:
$Qp'_{Cb} = qP_{Cb} + QpBdOffset_C$
$Qp'_{Cr} = qP_{Cr} + QpBdOffset_C$
$Qp'_{CbCr} = qP_{CbCr} + QpBdOffset_C$

TABLE 8-15

Specification of $Qp_C$ as a function of qPi for ChromaArrayType equal to 1

| | qPi | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

Referring to Table 21, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. When ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices $qPi_{Cb}$, $qPi_{Cr}$ and $qPi_{CbCr}$, respectively.

Furthermore, this document proposes another embodiment in which information for a quantization parameter is signaled.

For example, the present embodiment proposes syntax elements which may be used to control the derivation of a quantization parameter by indicating a user defined mode or a default mode through the flag of an SPS. Specifically, the present embodiment proposes a scheme for signaling the syntax elements of the following syntax structure. Meanwhile, a structure of the syntax elements is an example, and is not limited to a structure illustrated in the following table.

TABLE 22

| | Descriptor |
|---|---|
| $Qp_C$_data ( ) { | |
|   qPi_min_idx | ue(v) |
|   qPi_delta_max_idx | ue(v) |
|   for ( i = qPi_min_idx; i <= qPiMaxIdx; i++) | |
|     $Qp_C$_qPi_delta_val[ i ] | ue(v) |
|   QpOffset$_C$ | ue(v) |
| } | |

For example, the syntax element qPi_min_idx may represent a minimum qPi index used in chroma quantization.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. For example, maximum index qPiMaxIdx used in $Qp_c$ derivation may be derived like Equation 4.

Furthermore, for example, the syntax element $Qp_C$_qPi_delta_val[i] may represent the delta of a $Qp_C$ value for an i-th index.

Furthermore, for example, the syntax element QpOffset$_C$ may represent an offset value used in the derivation of Qp$_c$, such as the aforementioned contents.

As in the aforementioned embodiment, chroma quantization parameter, that is, Qp'Cb, Qp' Cr and Qp'CbCr may be derived using signaled user defined information or a default value used in a default table, such as Table 7.

For example, in the present embodiment, if a process of deriving a quantization parameter is written in a standard format, the process may be represented as in the following table.

TABLE 23

| Derivation process for quantization parameters |
|---|
| Inputs to this process are: |
| a luma location ( xCb, yCb ) specifying the top-left luma sample of the current coding block relative to the top-left luma sample of the current picture, |
| a variable cbWidth specifying the width of the current coding block in luma samples, |
| a variable cbHeight specifying the height of the current coding block in luma samples, |
| a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed. |
| In this process, the luma quantization parameter Qp'$_Y$ and the chroma quantization parameters Qp'$_{Cb}$ and Qp'$_{Cr}$ are derived. |
| The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively. |
| NOTE - : The current quantization group is a rectangluar region inside a coding tree block that shares the same qP$_{Y\_PRED}$. Its width and height are equal to the width and height of the coding tree node of which the top-left luma sample position is assigned to the variables CuQgTopLeftX and CuQgTopLeftY. |
| When treeType is equal to SINGLE_TREE or DUAL_TREE_LUMA, the predicted luma quantization parameter qP$_{Y\_PRED}$ is derived by the following ordered steps: |
| 1.The variable qP$_{Y\_PREV}$ is derived as follows: |
| If one or more of the following conditions are true, qP$_{Y\_PREV}$ is set equal to SliceQp$_Y$: |
| The current quantization group is the first quantization group in a slice. |
| The current quantization group is the first quantization group in a brick. |
| Otherwise, qP$_{Y\_PREV}$ is set |
| 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable qP$_{Y\_A}$ is derived as follows: |
| If one or more of the following conditions are true, qP$_{Y\_A}$ is set equal to qP$_{Y\_PREV}$ : |
| availableA is equal to FALSE. |
| the CTB address ctbAddrA of the CTB containing the luma coding block covering the luma location ( xQg − 1, yQg ) is not equal to CtbAddrInBs, where ctbAddrA is derived as follows: |
| xTmp = ( xQg − 1 ) >> MinTbLog2SizeY |
| yTmp = yQg >> MinTbLog2SizeY |
| minTbAddrA = MinTbAddrZs[ xTmp ][ yTmp ] |
| ctbAddrA = minTbAddrA >> ( 2 * ( CtbLog2SizeY − MinTbLog2SizeY ) ) |
| Otherwise, qP$_{Y\_A}$ is set equal to the luma quantization parameter Qp$_Y$ of the coding unit containing the luma coding block covering ( xQg − 1, yQg ). |
| 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to (xQg, yQg − 1 ) as inputs, and the output is assigned to availableB. The variable qP$_{Y\_B}$ is derived as follows: |
| If one or more of the following conditions are true, qP$_{Y\_B}$ is set equal to qP$_{Y\_PREV}$: |
| availableB is equal to FALSE. |
| the CTB address ctbAddrB of the CTB containing the luma coding block covering the luma location ( xQg, yQg − 1 ) is not equal to CtbAddrInBs, where ctbAddrB is derived as follows: |
| xTmp = xQg >> MinTbLog2SizeY |
| yTmp = ( yQg − 1 ) >> MinTbLog2SizeY |
| minTbAddrB = MinTbAddrZs[ xTmp ][ yTmp ] |
| ctbAddrB = |
| minTbAddrB >> ( 2 * ( CtbLog2SizeY − MinTbLog2SizeY ) ) (8-922) |
| Otherwise, qP$_{Y\_B}$ is set equal to the luma quantization parameter Qp$_Y$ of the coding unit containing the luma coding block covering ( xQg, yQg − 1 ). |
| 4. The predicted luma quantization parameter qP$_{Y\_PRED}$ is derived as follows: |
| If an the following conditions are true, then qP$_{Y\_PRED}$ is set equal to the luma quantization parameter Qp$_Y$ of the coding unit containing the luma coding block covering ( xQg, yQg − 1): |
| availableB is equal to TRUE. |
| the current quantization group is the first quantization group in a CTB row within a brick |
| Otherwise, qP$_{Y\_PRED}$ is derived as follows: |
| qP$_{Y\_PRED}$ ( qP$_{Y\_A}$ + qP$_{Y\_B}$ + 1) >> 1 |

TABLE 23-continued

Derivation process for quantization parameters

The variable $QP_Y$ is derived as follows:
$QP_Y =$
$(( qP_{Y\_PRED} + CuQpDeltaVal + 64 + 2 * QpBdOffset_Y )\%( 64 + QpBdOffset_Y ) ) - QpBdOffset_Y$
The luma quantization parameter $Qp'_Y$ is derived as follows:
$Qp'_Y = Qp_Y + QpBdOffset_Y$
When ChromaArrayType is not equal to 0 and treeType is equal to SINGLE_TREE or DUAL_TREE_CHROMA, the following applies:
When treeType is equal to DUAL_TREE_CHROMA, the variable $Qp_Y$ is set equal to the luma quantization parameter $Qp_Y$ of the luma coding unit that covers the luma location ( xCb + cbWidth/2, yCb + cbHeight/2).
The variables $qP_{Cb}$, $qP_{Cr}$ and $qP_{CbCr}$ are derived as follows:
$qPi_{Cb} = Clip3( -QpBdOffset_C, 69, Qp_Y + pps\_cb\_qp\_offset + slice\_cb\_qp\_offset )$
$qPi_{Cr} = Clip3( -QpBdOffset_C, 69, Qp_Y + pps\_cr\_qp\_offset + slice\_cr\_qp\_offset )$
$qPi_{CbCr} = Clip3( -QpBdOffset_C, 69, Qp_Y + pps\_joint\_cbcr\_qp$ offset $+ slice\_joint\_cbcr\_qp\_offset )$
If ChromaArrayType is equal to 1, and Qpc_data_default_flag is equal to FALSE,
the variables $qP_{Cb}$, $qP_{Cr}$ and $qP_{CbCr}$ are set equal to the value of $Qp_C$ based on the index qPi equal to $qPi_{Cb}$, $qPi_{Cr}$ and $qPi_{CbCr}$, respectively as described below:
The variable QprIdx[ i ] is derived as follows:
For i < qPi_min_idx. QpcIdx[ i ] is set equal to qPi.
For i = qPi_min_idx ... qPiMaxIdx, the following applies:
$Qp_CIdx[ i ] = Qp_C\_qPi\_delta\_val[ i ] + Qp_CIdx[ i -1 ]$
For i > qPiMaxIdx, $Qp_CIdx[ i ] = qPi - QpOffset_C$
The value of $Qp_C$ is derived as $Qp_CIdx[qPi]$
If ChromaArrayType is equal to 1, and Qpc_data_default_flag is equal to TRUE,
the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively
Otherwise, the variables $qP_{Cb}$, $qP_{Cr}$ and $qP_{CbCr}$ are set equal to Min( qPi, 63), based on the index qPi equal to $qP_{Cb}$, $qP_{Cr}$ and $qP_{CbCr}$, respectively.
The chroma quantization parameters for the Cb and Cr components, $Qp'_{Cb}$ and $Qp'_{Cr}$, and joint Cb-Cr coding $Qp'_{CbCr}$ are derived as follows:
$Qp'_{Cb} = qP_{Cb} + QpBdOffset_C$
$Qp'_{Cr} = qP_{Cr} + QpBdOffset_C$
$Qp'_{CbCr} = qP_{CbCr} + QpBdOffset_C$

TABLE 8-15

Specification of $Qp_C$ as a function of qPi for ChromaArrayType equal to 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

Referring to Table 23, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. For example, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived identically with a value of $Qp_C$ based on the same indices qPi as $qPi_{Cb}$, $qPi_{Cr}$ and $qPi_{CbCr}$, respectively, as follows.

For example, the parameter $Qp_CIdx[i]$ may be derived as follows.

When i<qPi_min_idx, $Qp_CIdx[qPi]$ may be set identically with qPi.

When i=qPi_min_idx . . . qPiMaxIdx, $Qp_CIdx[i]$ may be set as $Qp_C\_qPi\_delta\_val[i]+Qp_CIdx[i-1]$.

When i>qPiMaxIdx, $Qp_CIdx[i]$ may be set as qPi−$QpOffset_C$.

Thereafter, the $Qp_C$ may be set as the $Qp_CIdx[i]$.

Furthermore, referring to Table 23, when ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes syntax elements for a chroma quantization ($Qp_C$) derivation parameter in an adaptation parameter set (APS). For example, an APS ID may be signaled in a slice header. Furthermore, for example, there may be proposed a flag within a picture parameter set (PPS) that represents whether a default table is used or a table derived from information signaled in an APS is used. Furthermore, for example, if a default table is not used, an additional control scheme for supporting access to an APS including $Qp_C$ data may be added to a slice header.

Meanwhile, according to the existing video/image standard, chroma QP may be derived from luma QP, and may be updated by an additionally signaled chroma QP offset. The existing chroma quantization parameter $Qp_C$ table may be a default table, such as Table 7.

The present embodiment proposes adding a function for signaling a chroma quantization parameter $Qp_C$ as a function of an index qPi. An APS may be used to integrate signaling schemes of $Qp_C$ values.

For example, an APS according to the present embodiment may be the same as the following table.

TABLE 24

| | Descriptor |
|---|---|
| adaptation_parameter_set_rbsp( ) { | |
|   adaptation_parameter_set_id | u(5) |
|   aps_params_type | u(3) |
|   if( aps_params_type == ALF_APS ) | |
|     alf_data(adaptation_parameter_set_id ) | |
|   else if( aps_params_type == LMCS_APS ) | |
|     lmcs_data( ) | |
|   else if( aps_params_type == $Qp_C$_APS ) //2 | |
|     $Qp_C$_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

For example, the syntax element adaptation_parameter_set_id may provide an identifier of an APS referred to by other syntax elements.

Furthermore, for example, the syntax element aps_params_type may represent the type of APS parameters included in an APS as illustrated in Table 10.

Furthermore, for example, the syntax element aps_extension_flag may represent whether the aps_extension_data_flag syntax elements are present in an APS RBSP syntax structure. For example, the syntax element aps_extension_flag having a value of 1 may represent that the aps_extension_data_flag syntax elements are present in an APS RBSP syntax structure. The syntax element aps_extension_flag having a value of 0 may represent that the aps_extension_data_flag syntax elements are not present in an APS RBSP syntax structure.

Furthermore, for example, the syntax element aps_extension_data_flag may have any value. The presence (presence and value) of the aps_extension_data_flag may not affect decoding suitability for a profile specified in a version of this standard. For example, the decoding apparatus following a version of this standard may ignore all of the syntax elements aps_extension_data_flag.

$Qp_C$_data( ) disclosed in Table 24 may be signaled as in the following table.

TABLE 25

| | Descriptor |
|---|---|
| $Qp_C$_data ( ) { | |
|   qPi_min_idx | ue(v) |
|   qPi_delta_max_idx | ue(v) |
|   for ( i = qPi_min_idx; i <= qPiMaxIdx, i++) | |
|     $Qp_C$_qPi_delta_val[ i ] | ue(v) |
|   $Qp_C$Offset$_C$_present_flag | u(1) |
|   if($Qp_C$Offset$_C$_present_flag) | |
|     QpOffset$_C$ | ue(v) |
| } | |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. Furthermore, for example, a value of qPi_delta_max_idx may be in a range of 0 to 63. For example, a maximum index qPiMaxIdx used in $Qp_c$ derivation may be derived like Equation 4.

Furthermore, for example, the syntax element $Qp_C$_qPi_delta_val[i] may represent a difference between $Qp_C$ values for an i-th index. The a difference may also be called a delta.

Furthermore, for example, the syntax element $Qp_C$Offset$_C$_present_flag may represent whether QpOffset$_C$ is present in a bitstream. For example, $Qp_C$Offset$_C$_present_flag having a value of 1 may represent that QpOffset$_C$ is present in a bitstream. Furthermore, for example, $Qp_C$Offset$_C$_present_flag having a value of 0 may represent that QpOffset$_C$ is not present in a bitstream. When $Qp_C$Offset$_C$_present_flag is not present, $Qp_C$Offset$_C$_present_flag may be inferred as 0.

Furthermore, for example, the syntax element QpOffset$_C$ may represent an offset value used in the derivation of $Qp_c$.

For example, a parameter $Qp_C$Idx[qPi] for qPi may be derived as follows. In this case, the qPi may be 0 to 63.

When qPi<qPi_min_idx, $Qp_C$Idx[qPi] may be set identically with qPi.

When qPi=qPi_min_idx . . . qPiMaxIdx, $Qp_C$Idx[qPi] may be set as $Qp_C$_qPi_delta_val[qPi]+$Qp_C$Idx[qPi−1].

If qPi>qPiMaxIdx, when $Qp_C$Offset$_C$_present_flag is 1, $Qp_C$Idx[qPi] may be set as qPi−QpOffset$_C$. If $Qp_C$Offset$_C$_present_flag is not 1, that is, if $Qp_C$Offset$_C$_present_flag is 0, $Qp_C$Idx[qPi] may be set as qPi−(qPiMaxIdx−$Qp_C$Idx[qPiMaxIdx]).

Thereafter, a value of $Qp_C$ may be derived as $Qp_C$Idx[qPi].

Furthermore, the present embodiment proposes a flag signaled as a PPS as in the following table.

TABLE 26

| | Descriptor |
|---|---|
| pic_parameter_set_rbsp( ) { | |
|   pps_pic_parameter_set_id | ue(v) |
|   ... | |
|   Qpc_data_default_flag | u(1) |
|   ... | |

For example, the syntax element $Qp_c$_data_default_flag may represent whether a user defined mode is used for quantization parameter derivation. For example, $Qp_c$_data_default_flag having a value of 0 may represent that a user defined mode is used for quantization parameter derivation. Furthermore, for example, $Qp_c$_data_default_flag having a value of 1 may represent that the aforementioned default table is used for quantization parameter derivation. The default table may be the same as Table 7. If $Qp_c$_data_default_flag is not present, $Qp_c$_data_default_flag may be inferred as 1.

Furthermore, the present embodiment proposes a syntax element signaled as a slice header as in the following table.

TABLE 27

| | Descriptor |
|---|---|
| slice_header( ) { | |
|   slice_pic_parameter_set_id | ue(v) |
|   ... | |
|   if(!Qpc_data_default_flag ) | |
|     slice Qp$_C$_aps_ id | u(5) |
|   ... | |
|   byte_alignment( ) | |
| } | |

For example, the syntax element slice_Qp$_c$_aps_id may represent adaptation_parameter_set_id of a Qp$_c$_APS referred to by a slice. TemporalId of a Qp$_c$ APS NAL unit having adaptation_parameter_set_id, such as slice_Qp$_c$_aps_id, may be smaller than or the same as TemporalId of a coded slice NAL unit. If a plurality of Qp$_c$ APSs having adaptation_parameter_set_id having the same value is referred to by two or more slices of the same picture, a plurality of Qp$_c$ APSs having adaptation_parameter_set_id having the same value may have the same content.

For example, in the present embodiment, if a process of deriving a quantization parameter is written in a standard format, the process may be represented as in the following table.

TABLE 28

| 8.7.1 Derivation process for quantization parameters |
|---|
| Inputs to this process are:<br>  a luma location ( xCb, yCb ) specifying the top-left luma sample of the current coding block relative to the top-left luma sample of the current picture,<br>  a variable cbWidth specifying the width of the current coding block in luma samples,<br>  a variable cbHeight specifying the height of the current coding block in luma samples,<br>a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.<br>In this process, the luma quantization parameter Qp'$_Y$ and the chroma quantization parametersQp'$_{Cb}$ and Qp'$_{Cr}$ are derived.<br>The luma location ( xQg, yQg ), specifies the top-left luma sample of the current quantization group relative to the top left luma sample of the current picture, The horizontal and vertical positions xQg and yQg are set equal to CuQgTopLeftX and CuQgTopLeftY, respectively.<br>NOTE - : The current quantization group is a reetangluar region inside a coding tree block that shares the same qP$_{Y\_PRED}$. Its width and height are equal to the width and height of the coding tree node of which the top-left luma sample position is assigned to the variables CuQgTopLeftX and CuQgTopLeftY.<br>When treeType is equal to SINGLE_TREE or DUAL_TREE_LUMA, the predicted luma quantization parameter qP$_{Y\_PRED}$ is derived by the following ordered steps:<br>  1. The variable qP$_{Y\_PREV}$ is derived as follows:<br>    If one or more of the following conditions are true, qP$_{Y\_PREV}$ is set equal to SliceQp$_Y$:<br>      The current quantization group is the first quantization group in a slice.<br>      The current quantization group is the first quantization group in a brick.<br>    Otherwise, qP$_{Y\_PREV}$ is set<br>  2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable qP$_{Y\_A}$ is derived as follows:<br>    If one or more of the following conditions are true, qP$_{Y\_A}$ is set equal to P$_{Y\_PREV}$<br>      availableA is equal to FALSE.<br>      the CTB address ctbAddrA of the CTB containing the luma coding block covering the luma location ( xQg − 1, yQg ) is not equal to CtbAddrInBs, where ctbAddrA is derived as follows:<br>        xTmp = ( xQg − 1 ) >> MinTbLog2SizeY<br>        yTmp = yQg >> MinTbLog2SizeY<br>        minTbAddrA = MinTbAddrZs[ xTmp ][ yTmp ]<br>        ctbAddrA = minTbAddrA >> ( 2 * ( CtbLog2 SizeY − MinTbLog2SizeY ) )<br>    Otherwise, qP$_{Y\_A}$ is set equal to the luma quantization parameter Qp$_Y$ of the coding unit containing the luma coding block covering ( xQg − 1, yQg ).<br>  3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable qP$_{Y\_B}$ is derived as follows:<br>    If one or more of the following conditions are true, qP$_{Y\_B}$ is set equal to qP$_{Y\_PREV}$:<br>      availableB is equal to FALSE.<br>      the CTB address ctbAddrB of the CTB containing the luma coding block covering the luma location ( xQg, yQg − 1 ) is not equal to CtbAddrInBs, where ctbAddrB is derived as follows:<br>        xTmp = xQg >> MinTbLog2SizeY<br>        yTmp = (yQg − 1 ) >> MinTbLog2SizeY<br>        minTbAddrB = MinTbAddrZs[ xTmp ][ yTmp ]    (8-922)<br>        ctbAddrB =<br>        minTbAddrB >> ( 2 * ( CtbLog2SizeY − MinTbLog2SizeY ) )<br>    Otherwise, qP$_{Y\_B}$ is set equal to the luma quantization parameter Qp$_Y$ of the coding unit containing the luma coding block covering ( xQg, yQg − 1 ). |

TABLE 28-continued

4. The predicted luma quantization parameter $qP_{Y\_PRED}$ is derived as follows:
   If all the following conditions are true, then $qP_{Y\_PRED}$ is set equal to the luma
   quantization parameter $Qp_Y$ of the coding unit containing the luma coding block
   covering ( xQg, yQg − 1 ):
      availableB is equal to TRUE.
      the current quantization group is the first quantization group in a CTB row
      within a brick
   Otherwise, $qP_{Y\_PRED}$ is derived as follows:
      $qP_{Y\_PRED} = ( qP_{Y\_A} + qP_{Y\_B} + 1 ) \gg 1$ The variable $Qp_Y$ is derived as follows:
   $Qp_Y =$
   $( ( qP_{Y\_PRED} + CuQpDeltaVal + 64 + 2 * QpBdOffset_Y )\%( 64 + QpBdOffset_Y ) ) - Qp$
   $BdOffset_Y$
The luma quantization parameter $Qp'_Y$ is derived as follows:
   $Qp'_Y = Qp_Y + QpBdOffset_Y$
When ChromaArrayType is not equal to 0 and treeType is equal to SINGLE_TREE or
DUAL_TREE_CHROMA, the following applies:
When treeType is equal to DUAL_TREE_CHROMA, the variable $Qp_Y$ is set equal to the
luma quantization parameter $Qp_Y$ of the luma coding unit that covers the luma location
( xCb + cbWidth / 2, yCb + cbHeight / 2 ).
The variables $qP_{Cb}$, $qP_{Cr}$ and $qP_{CbCr}$ are derived as follows:
   $qPi_{Cb} = \text{Clip3}( -QpBdOffset_C, 69, Qp_Y + pps\_cb\_qp\_offset + slice\_cb\_qp\_offset )$
   $qPi_{Cr} = \text{Clip3}( -QpBdOffset_C, 69, Qp_Y + pps\_cr\_qp\_offset + slice\_cr\_qp\_offset )$
   $qPi_{CbCr} = \text{Clip3}( -QpBdOffset_C, 69, Qp_Y + pps\_joint\_cbcr\_qp\_offset +$
   $slice\_joint\_cbcr\_qp\_offset )$
   If ChromaArrayType is equal to 1, and Qpc_data_default_flag is equal to FALSE,
   the variables $qP_{Cb}$, $qP_{Cr}$ and $qP_{CbCr}$ are set equal to the value of $Qp_C$ as-specified in
   clause 7.x.x based on the index qPi equal to $qP_{Cb}$, $qP_{Cr}$ and $qP_{CbCr}$, respectively
   If ChromaArrayType is equal to 1, and Qpc_data_default_flag is equal to TRUE,
   the variables $qP_{Cb}$, $qP_{Cr}$ and $qP_{CbCr}$ are specified in Table 8-15 based on the index qPi
   equal to $qP_{Cb}$, $qP_{Cr}$ and $qP_{CbCr}$, respectively

TABLE 8-15

Specification of $Qp_C$ as a function of qPi for ChromaArrayType equal to 1

| qPi | <30 | 30 | 31 | 32 | 32 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | =qPi | 29 | 30 | 31 | 32 | 33 | 33 | 34 | 34 | 35 | 35 | 36 | 36 | 37 | 37 | =qPi − 6 |

Referring to Table 28, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, in the present embodiment, it is proposed that user defined derivation of chroma quantization is signaled in an SPS as follows. For example, the present embodiment proposes user defined chroma quantization ($Qp_C$). For example, the flag of an SPS may represent whether a default table is used for chroma quantization derivation or the contents of the table for chroma quantization derivation is derived in information signaled in the SPS.

For example, the present embodiment proposes a scheme for performing chroma quantization as a function of an index qPi by using syntax elements illustrated in the following table.

TABLE 29

| | Descriptor |
|---|---|
| $Qp_C$_data( ) { | |
|   qPi_min_idx | ue(v) |
|   qPi_delta_max_idx | ue(v) |
|   for ( i = qPi_min_idx; i <= qPiMaxIdx; i++) | |
|     $Qp_C$_qPi_delta_val[ i ] | ue(v) |
| } | |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element $Qp_C$_qPi_delta_val[i] may represent the delta of a $Qp_C$ value for an i-th index.

For example, a parameter $Qp_C$Idx[qPi] may be derived as follows.

When qPi<qPi_min_idx, $Qp_C$Idx[qPi] may be set identically with qPi.

When qPi=qPi_min_idx ... qPiMaxIdx, $Qp_C Idx[qPi]$ may be set as $Qp_C\_qPi\_delta\_val[qPi]+Qp_C Idx[qPi-1]$.

When qPi>qPiMaxIdx, $Qp_C Idx[qPi]$ may be set as qPi−(qPiMaxIdx−$Qp_C Idx[qPiMaxIdx]$).

Thereafter, the $Qp_C$ may be set as the $Qp_C Idx[qPi]$.

Furthermore, the flag of an SPS representing whether a default table is used for chroma quantization derivation or whether signaled information signaled information is used for chroma quantization derivation, which is proposed in the present embodiment, may be the same as the following table.

TABLE 30

| | Descriptor |
|---|---|
| seq_parameter_set_rbsp( ) { | |
| sps_decoding_parameter_set_id | u(4) |
| ... | |
| Qpc_data_default_flag | u(1) |

TABLE 30-continued

| | Descriptor |
|---|---|
| if(!$Qp_C$_data_default_flag) | |
| $Qp_C$_data( ) | |
| ... | |

For example, the syntax element $Qp_C$_data_default_flag may represent whether a user defined mode is used for the derivation of a quantization parameter. For example, $Qp_C$_data_default_flag having a value of 0 may represent that a user defined mode is used for the derivation of a quantization parameter. Furthermore, for example, $Qp_C$_data_default_flag having a value of 1 may represent that a default table is used for the derivation of a quantization parameter. The default table may be the same as Table 7. Furthermore, if $Qp_C$_data_default_flag is not present, the $Qp_C$_data_default_flag may be inferred as 1.

For example, according to the present embodiment, if a process of deriving a quantization parameter is written in a standard format, the process may be represented as in the following table.

TABLE 31

| 8.7.1 Derivation process for quantization parameters |
|---|
| Inputs to this process are: |
|     a luma location ( xCb, yCb ) specifying the top-left luma sample of the current coding block relative to the top-left luma sample of the current picture, |
|     a variable cbWidth specifying the width of the current coding block in luma samples, |
|     a variable cbHeight specifying the height of the current coding block in lama samples, |
|     a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed. |
| In this process, the luma quantization parameter $Qp'_Y$ and the chroma quantization parameters $Qp'_{Cb}$ and $Qp'_{Cr}$ are derived. |
| The luma location ( xQg, yQg ), specifies the top-left luma sample of the current quantization group relative, to the top left luma sample of the current picture. The horizontal and vertical positions xQg and yQg are set equal to CuQgTopLeftX and CuQgTopLeftY, respectively. |
| NOTE - : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY. |
| When treeType is equal to SINGLE_TREE or DUAL_TREE_LUMA, the predicted luma quantization parameter $qP_{Y\_PRED}$ is derived by the following ordered steps: |
|   1. The variable $qP_{Y\_PREV}$ is derived as follows: |
|     If one or more of the following conditions are true. $qP_{Y\_PREV}$ is set equal to SliceQp$_Y$: |
|       The current quantization group is the first quantization group in a slice. |
|       The current quantization group is the first quantization group in a brick. |
|     Otherwise, $qP_{Y\_PREV}$ is set |
|   2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows: |
|     If one or more of the following conditions are true, $qP_{Y\_A}$ is set equal to $qP_{Y\_PREV}$: |
|       availableA is equal to FALSE, |
|       the CTB address ctbAddrA of the CTB containing the luma coding block covering the luma location ( xQg − 1, yQg ) is not equal to CtbAddrInBs, where ctbAddrA is derived as follows: |
|         xTmp = ( xQg − 1 ) >> MinTbLog2SizeY |
|         yTmp = yQg >> MinTbLog2SizeY |
|         minTbAddrA = MinTbAddrZs[ xTmp ][ yTmp ] |
|         ctbAddrA = minTbAddrA >> ( 2 * ( CtbLog2SizeY − MinTbLog2SizeY ) ) |
|     Otherwise, $qP_{Y\_A}$ is set equal to the luma quantization parameter QpY of the coding unit containing the luma coding block covering ( xQg − 1, yQg ). |
|   3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows: |

TABLE 31-continued

If one or more of the following conditions are true, $qP_{Y\_B}$ is set equal to $qP_{Y\_PREV}$:
- availableB is equal to FALSE.
- the CTB address ctbAddrB of the CTB containing the luma coding block covering the luma location ( xQg, yQg − 1 ) is not equal to CtbAddrInBs, where ctbAddrB is derived as follows:
  xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )   (8-922)

Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:
   If all the following conditions are true, then $qP_{Y\_PRED}$ is set equal to the luma quantization parameter $Qp_Y$ of the coding unit containing the luma coding block covering ( xQg, yQg − 1 ):
   - availableB is equal to TRUE.
   - the current quantization group is the first quantization group in a CTB row within a brick Otherwise, $qP_{Y\_PRED}$ is derived as follows:
   $qP_{Y\_PRED} = ( qP_{Y\_A} + qP_{Y\_B} + 1 ) >> 1$ The variable $Qp_Y$ is derived as follows:
$Qp_Y =$
$( ( qP_{Y\_PREV} ) + CuQpDeltaVal + 64 + 2 * QpBdOffset_Y )\%( 64 + QpBdOffset_Y ) ) - QpBdOffset_Y$ The luma quantization parameter $Qp'_Y$ is derived as follows:
$Qp'_Y = Qp_Y + QpBdOffset_Y$ When ChromaArrayType is not equal to 0 and treeType is equal to SINGLE_TREE or DUAL_TREE_CHROMA, the following applies:
  When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).
  The variables $qP_{Cb}$, $qP_{Cr}$ and $qP_{CbCr}$ are derived as follows:
  $qPi_{Cb} = Clip3( -QpBdOffset_C, 69, Qp_Y + pps\_cb\_qp\_offset + slice\_cb\_qp\_offset )$
  $qPi_{Cr} = Clip3( -QpBdOffset_C, 69, Qp_Y + + pps\_cr\_qp\_offset + slice\_cr\_qp\_offset )$
  $qPi_{CbCr} = Clip3( -QpBdOffset_C, 69, Qp_Y + + pps\_joint\_cbcr\_qp\_offset + slice\_joint\_cbcr\_qp\_offset )$ If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively.

If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively.

TABLE 8-15

Specification of $Qp_C$ as a function of qPi for ChromaArrayType equal to 1

| | qPi | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

Referring to Table 31, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes adding a function for signaling a chroma quantization parameter $Qp_C$ as a function of an index qPi. For example, there may be proposed a scheme for signaling syntax elements for a user defined table for quantization parameter derivation in a PPS. Accordingly, flexibility regarding changing a user defined table and a default table in each picture that refers to a PPS can be provided.

Syntax elements for a signaled user defined table in a PPS proposed in the present embodiment may be the same as the following table.

TABLE 32

| | Descriptor |
|---|---|
| $Qp_C$_data( ) | |
| qPi_min_idx | ue(v) |
| qPi_delta_max_idx | ue(v) |

TABLE 32-continued

| | Descriptor |
|---|---|
| for ( i = qPi_min_idx; i <= qPiMaxIdx; i++)<br>    Qp$_C$_qPi_delta_val[ i ]<br>} | ue(v) |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element Qp$_C$_qPi_delta_val[i] may represent the delta of a Qp$_C$ value for an i-th index.

For example, a parameter Qp$_C$Idx[qPi] may be derived as follows.

When qPi<qPi_min_idx, Qp$_C$Idx[qPi] may be set identically with qPi.

When qPi=qPi_min_idx . . . qPiMaxIdx, Qp$_C$Idx[qPi] may be set as Qp$_C$_qPi_delta_val[qPi]+Qp$_C$Idx[qPi–1].

When qPi>qPiMaxIdx, Qp$_C$Idx[qPi] may be set as qPi–(qPiMaxIdx–Qp$_C$Idx[qPiMaxIdx]).

Thereafter, the Qp$_C$ may be set as the Qp$_C$Idx[qPi].

Furthermore, the flag of SPS representing whether a default table is used for chroma quantization derivation or whether signaled information is used for chroma quantization derivation, which is proposed in the present embodiment, may be the same as the following table.

TABLE 33

| | Descriptor |
|---|---|
| seq_parameter_set_rbsp( ) {<br>  sps_decoding_parameter_set_id<br>...<br>  Qpc_data_default_flag<br>  if(!Qp$_C$_data_default_flag)<br>    Qp$_C$_data( )<br>... | u(4)<br><br>u(1) |

For example, the syntax element Qp$_c$_data_default_flag may represent whether a user defined mode is used for the derivation of a quantization parameter. For example, Qp$_c$_data_default_flag having a value of 0 may represent that a user defined mode is used for the derivation of a quantization parameter. That is, for example, Qp$_c$_data_default_flag having a value of 0 may represent that chroma quantization parameter data Qp$_c$_data( ) is used. When the Qp$_c$_data_default_flag is 0, the chroma quantization parameter data Qp$_c$_data( ) may be signaled. Furthermore, for example, Qp$_c$_data_default_flag having a value of 1 may represent that a default table is used for the derivation of a quantization parameter. The default table may be the same as Table 7. Furthermore, if Qp$_c$_data_default_flag is not present, the Qp$_c$_data_default_flag may be inferred as 1.

For example, in the present embodiment, if a process of deriving a quantization parameter is written in a standard format, the process may be represented as in the following table.

TABLE 34

| 8.7.1 Derivation process for quantization parameters |
|---|
| Inputs to this process are:<br>    a luma location ( xCb, yCb ) specifying the top-left luma sample of the current coding block relative to the top-left luma sample of the current picture,<br>    a variable cbWidth specifying the width of the current coding block in luma samples,<br>    a variable cbHeight specifying the height of the current coding block in lama samples,<br>    a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.<br>In this process, the luma quantization parameter Qp'$_Y$ and the chroma quantization parameters Qp'$_{Cb}$ and Qp'$_{Cr}$ are derived.<br>The luma location ( xQg, yQg ), specifies the top-left luma sample of the current quantization group relative, to the top left luma sample, of the current picture. The horizontal and vertical positions xQg and yQg are set equal to CuQgTopLeftX and CuQgTopLeftY, respectively.<br>NOTE - : The current quantization group is a rectangluar region inside a coding tree block that shares the same qP$_{Y\_PRED}$. Its width and height are equal to the width and height of the coding tree node of which the top-left luma sample position is assigned to the variables CuQgTopLeftX and CuQgTopLeftY.<br>When treeType is equal to SINGLE_TREE or DUAL_TREE_LUMA, the predicted luma quantization parameter qP$_{Y\_PRED}$ is derived by the following ordered steps:<br>  1.  The variable qP$_{Y\_PREV}$ is derived as follows:<br>        If one or more of the following conditions are true. qP$_{Y\_PREV}$ is set equal to SliceQp$_Y$:<br>            The current quantization group is the first quantization group in a slice.<br>            The current quantization group is the first quantization group in a brick.<br>        Otherwise, qP$_{Y\_PREV}$ is set<br>  2.  The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg – 1, yQg ) as inputs, and the output is assigned to availableA. The variable qP$_{Y\_A}$ is derived as follows:<br>        If one or more of the following conditions are true, qP$_{Y\_A}$ is set equal to qP$_{Y\_PREV}$:<br>            availableA is equal to FALSE. |

TABLE 34-continued the CTB address ctbAddrA of the CTB containing the luma coding block
covering the luma location ( xQg − 1, yQg ) is not equal to CtbAddrInBs,
where ctbAddrA is derived as follows:
xTmp = ( xQg − 1 ) >> MinTbLog2SizeY
yTmp = yQg >> MinTbLog2SizeY
minTbAddrA = MinTbAddrZs[ xTmp ][ yTmp ]
ctbAddrA = minTbAddrA >> ( 2 * ( CtbLog2SizeY − MinTbLog2SizeY ) )
Otherwise, $qP_{Y\_A}$ is set equal to the luma quantization parameter $Qp_Y$ of the
coding unit containing the luma coding block covering ( xQg − 1, yQg ).

3. The availability derivation process for a block as specified in clause 6.4.X [Ed. (BB):
Neighbouring blocks availability checking process tbd] is invoked with the location
( xCurr, yCurr ) set equal to ( xCb, yCb ) and the neighbouring location
( xNbY, yNbY ) set equal to ( xQg, yQg − 1 ) as inputs, and the output is assigned to
availableB. The variable $qP_{Y\_B}$ is derived as follows:
If one or more of the following conditions are true, $qP_{Y\_B}$ is set equal to $qP_{Y\_PREV}$:
availableB is equal to FALSE.
the CTB address ctbAddrB of the CTB containing the luma coding block
covering the luma location ( xQg, yQg − 1 ) is not equal to CtbAddrInBs,
where ctbAddrB is derived as follows:
xTmp = xQg >> MinTbLog2SizeY
yTmp = ( yQg − 1 ) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) )   (8-922)
Otherwise, $qP_Y$ is set equal to the luma quantization parameter $Qp_Y$ of the
coding unit containing the luma coding block covering ( xQg, yQg − 1 ).

4. The predicted luma quantization parameter $qP_{Y\_PRRED}$ is derived as follows:
If all the following conditions are true., then $(IP_{Y\_PRED}$ is set equal to the luma
quantization parameter $Qp_Y$ of the coding unit containing the luma coding block
covering ( xQg, yQg − 1 ):
availableB is equal to TRUE.
the current quantization group is the first quantization group in a CTB row
within a brick
Otherwise, $qP_{Y\_PRED}$ is derived as follows:
$qP_{Y\_PRED} = ( qP_{Y\_A} + qP_{Y\_B} + 1 ) >> 1$ The variable $Qp_Y$ is derived as follows:
$QP_Y =$
$( ( qP_{Y\_PRED} + CuQpDeltaVal + 64 + 2 * QpBdOffset )\%( 64 + QpBdOffset_Y ) ) −$
$QPBdOffset_Y$ The luma quantization parameter $Qp'_Y$ is derived as follows:
$Qp'_Y = Qp_Y + QpBdOffset_Y$ When ChromaArrayType is not equal to 0 and treeType is equal to SINGLE_TREE or
DUAL_TREE_CHROMA, the following applies:
When treeType is equal to DUAL_TREE_CHROMA, the variable $Qp_Y$ is set equal to the
luma quantization parameter $Qp_Y$ of the luma coding unit that covers the luma location
( xCb + cbWidth / 2, yCb + cbHeight / 2 ).
The variables $qP_{Cb}$, $qP_{Cr}$ and $qP_{CbCr}$ are derived as follows:
$qPi_{Cb}$ = Clip3(− $QpBdOffset_C$, 69, $Qp_Y$ + pps_cb_qp_offset + slice_cb_qp_offset )
$qPi_{Cr}$ = Clip3( − $QpBdOffset_C$, 69, $Qp_Y$ + pps_cr_qp_offset + slice_cr_qp_offset )
$qPi_{CbCr}$ = Clip3(− $QpBdOffset_C$, 69, $Qp_Y$ + pps_joint_cbcr_qp_offset + slice_joint_
cbcr_qp_offset )
If ChromaArrayType is equal to 1, and Qpc_data_default_flag is equal to FALSE,
the variables $qP_{Cb}$, $qP_{Cr}$ and $qP_{CbCr}$ are set equal to the value of $Qp_C$ as-specified in
clause 7.x.x based on the index qPi equal to $qPi_{Cb}$, $qPi_{Cr}$ and $qPi_{CbCr}$, respectively.
If ChromaArrayType is equal to 1, and Qpc_data_default_flag is equal to TRUE,
the variables $qP_{Cb}$, $qP_{Cr}$ and $qP_{CbCr}$ are specified in Table 8-15 based on the index qPi
equal to $qPi_{Cb}$, $qPi_{Cr}$ and $qPi_{CbCr}$, respectively.

TABLE 8-15

Specification of $Qp_C$ as a function of qPi for ChromaArrayType equal to 1

| | qPi | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

Referring to Table 34, when ChromaArrayType is 1 and Qp$_c$_data_default_flag indicates false (i.e., for example, when Qp$_c$_data_default_flag is 0), the parameters qP$_{Cb}$, qP$_{Cr}$ and qP$_{CbCr}$ may be derived based on signaled user defined information as proposed in the present embodiment. Furthermore, for example, ChromaArrayType is 1 and Qp$_c$_data_default_flag indicates true (i.e., for example, when Qp$_c$_data_default_flag is 1), the parameters qP$_{Cb}$, qP$_{Cr}$ and qP$_{CbCr}$ may be derived by a default table based on the same indices qPi as qPi$_{Cb}$, qPi$_{Cr}$ and qPi$_{CbCr}$, respectively.

Furthermore, this document proposes another embodiment in which information for a quantization parameter is signaled.

For example, the present embodiment proposes a common mode in which a chroma quantization parameter $Qp_C$ is derived and signaled.

Chroma quantization parameter data $Qp_C\_data( )$ for a chroma quantization parameter proposed in the present embodiment may be signaled as in the following table.

TABLE 35

| | Descriptor |
|---|---|
| $Qp_C\_data( )$ | |
|   qPi_min_idx | ue(v) |
|   qPi_delta_max_idx | ue(v) |
|   for ( i = qPi_min_idx; i <= qPiMaxIdx; i++ ) | |
|     $Qp_C\_qPi\_delta\_val[ i ]$ | ue(v) |
| } | |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_C$ derivation. A value of qPiMaxIdx may be greater than or equal to qPi_min_idx. A value of qPi_delta_max_idx may be in a range of 0 to 63. For example, a maximum index qPiMaxIdx used in $Qp_C$ derivation may be derived like Equation 4.

Furthermore, for example, the syntax element $Qp_C\_qPi\_delta\_val[i]$ may represent the delta of a $Qp_C$ value for an i-th index.

For example, a parameter $Qp_C Idx[qPi]$ may be derived as follows.

When qPi<qPi_min_idx, $Qp_C Idx[qPi]$ may be set identically with qPi.

When qPi=qPi_min_idx . . . qPiMaxIdx, $Qp_C Idx[qPi]$ may be set as $Qp_C\_qPi\_delta\_val[qPi]+Qp_C Idx[qPi-1]$.

When qPi>qPiMaxIdx, $Qp_C Idx[qPi]$ may be set as qPi−(qPiMaxIdx−$Qp_C Idx[qPiMaxIdx]$).

Thereafter, the $Qp_C$ may be set as the $Qp_C Idx[qPi]$.

Furthermore, the present embodiment proposes a scheme for signaling a flag representing whether a default table is used for chroma quantization derivation or whether signaled information is used for chroma quantization derivation. The flag may be signaled through a high level syntax, such as a sequence parameter set (SPS), or a picture parameter set (PPS). The flag signaled through a high level syntax may be the same as the following table.

TABLE 36

| | Descriptor |
|---|---|
| high_level_parameter_set( ) { | |
| ... | |
|   Qpc_data_default_flag | u(1) |
|   if(!$Qp_C\_data\_default\_flag$) | |
|     $Qp_C\_data( )$ | |
| ... | |

For example, the syntax element $Qp_C\_data\_default\_flag$ may represent whether a user defined mode is used for the derivation of a quantization parameter. For example, $Qp_C\_data\_default\_flag$ having a value of 0 may represent that a user defined mode is used for the derivation of a quantization parameter. That is, for example, $Qp_C\_data\_default\_flag$ having a value of 0 may represent chroma quantization parameter data $Qp_C\_data( )$ is used. When the $Qp_C\_data\_default\_flag$ is 0, the chroma quantization parameter data $Qp_C\_data( )$ may be signaled. Furthermore, for example, $Qp_C\_data\_default\_flag$ having a value of 1 may represent that a default table is used for the derivation of a quantization parameter. The default table may be the same as Table 7. Furthermore, if $Qp_C\_data\_default\_flag$ is not present, the $Qp_C\_data\_default\_flag$ may be inferred as 1.

For example, in the present embodiment, if a process of deriving a quantization parameter is written in a standard format, the process may be represented as in the following table.

TABLE 37

| 8.7.1 Derivation process for quantization parameters |
|---|
| Inputs to this process are:<br>  a luma location ( xCb, yCb ) specifying the top-left luma sample of the current coding block relative to the top-left luma sample of the current picture,<br>  a variable cbWidth specifying the width of the current coding block in luma samples,<br>  a variable cbHeight specifying the height of the current coding block in luma samples,<br>  a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.<br>In this process, the luma quantization parameter $Qp'_Y$ + and the chroma quantization parameters $Qp'_{Cb}$ and $Qp'_{Cr}$ are derived.<br>The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.<br>NOTE - : The current quantization group is a rectangluar region inside a coding tree block that shares the same $qP_{Y\_PRED}$. Its width and height are equal to the width and height of the coding tree node of which the top-left luma sample position is assigned to the variables CuQgTopLefiX and CuQgTopLeftY.<br>When treeType is equal to SINGLE_TREE or DUAL_TREE_LUMA, the predicted luma quantization parameter $qP_{Y\_PRED}$ is derived by the following ordered steps:<br>  1.  The variable $qP_{Y\_PREV,\ is\ derived\ as\ follows}$:<br>      If one or more of the following conditions are true, $qP_{Y\_PREV}$ is set equal to $SliceQp_Y$:<br>        The current quantization group is the first quantization group in a slice.<br>        The current quantization group is the first quantization group in a brick.<br>      Otherwise, $qP_{Y\_PREV}$ is set |

TABLE 37-continued

2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
   If one or more of the following conditions are true, $qP_{Y\_A}$ is set equal to $qP_{Y\_PREV}$:
      availableA is equal to FALSE.
      the CTB address ctbAddrA of the CTB containing the luma coding block covering the luma location ( xQg − 1, yQg ) is not equal to CtbAddrInBs, where ctbAddrA is derived as follows:
      xTmp = ( xQg − 1 ) >> MinTbLog2SizeY
      yTmp = yQg >> MinTbLog2SizeY
      minTbAddrA = MinTbAddrZs[ xTmp ][ yTmp ]
      ctbAddrA = minTbAddrA >> ( 2 * ( CtbLog2SizeY − MinTbLog2SizeY ) )
   Otherwise, $qP_{Y\_A}$ is set equal to the luma quantization parameter $Qp_Y$ of the coding unit containing the luma coding block covering ( xQg − 1, yQg ).
3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
   If one or more of the following conditions are true, $qP_{Y\_B}$ is set equal to $qP_{Y\_PREV}$:
      availableB is equal to FALSE.
      the CTB address ctbAddrB of the CTB containing the luma coding block covering the luma location ( xQg, yQg − 1 ) is not equal to CtbAddrInBs, where ctbAddrB is derived as follows:
      xTmp = xQg >> MinTbLog2SizeY
      yTmp = ( yQg − 1 ) >> MinTbLog2SizeY
      minTbAddrB = MinTbAddrZs[ xTmp ][ yTmp ]
      ctbAddrB =
      minTbAddrB >> ( 2 * ( CtbLog2SizeY − MinTbLog2SizeY ) )     (8-922)
   Otherwise, $qP_{Y\_B}$ is set equal to the luma quantization parameter $Qp_Y$ of the coding unit containing the luma coding block covering ( xQg, yQg − 1 ).
4. The predicted luma quantization parameter $qP_{Y\_PRED}$ is derived as follows:
   If all the following conditions are true, then $qP_{Y\_PRED}$ is set equal to the luma quantization parameter Qp
   covering ( xQg, yQg − 1 ):
      availableB is equal to TRUE.
      the current quantization group is the first quantization group in a CTB row within a brick
   Otherwise, $qP_{Y\_PRED}$ is derived as follows:
      $qP_{Y\_PRED} = ( qP_{Y\_A} + qP_{Y\_B} + 1 ) >> 1$ The variable $Qp_Y$ is derived as follows:
$Qp_Y =$
$( ( qP_{Y\_PRED} + CuQpDeltaVal + 64 + 2 * QpBdOffset_Y )\%( 64 + QpBdOffset_Y ) ) -$
$QpBdOffset_Y$
The luma quantization parameter $Qp'_Y$ is derived as follows:
$Qp'_Y = Qp_Y + QpBdOffset_Y$
When ChromaArrayType is not equal to 0 and treeType is equal to SINGLE_TREE or DUAL_TREE_CHROMA, the following applies:
   When treeType is equal to DUAL_TREE_CHROMA, the variable $Qp_Y$ is set equal to the luma quantization parameter $Qp_y$ of the luma coding unit that covers the luma location ( xCb + cbWidth / 2, yCb + cbHeight / 2 ).
   The variables $qP_{Cb}$, $qP_{Cr}$ and $qP_{CbCr}$ are derived as follows:
      $qPi_{Cb} = Clip3( -QpBdOffset_C, 69, Qp_Y + pps\_cb\_qp\_offset + slice\_cb\_qp\_offset )$
      $qPi_{Cr} = Clip3( -QpBdOffset_C, 69, Qp_Y + pps\_cr\_qp\_offset + slice\_cr\_qp\_offset )$
      $qPi_{CbCr} = Clip3( -QpBdOffset_C, 69, Qp_Y + pps\_joint\_cbcr\_qp\_offset + slice\_joint\_cbcr\_qp\_offset )$
   If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively.
   If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively.

TABLE 8-15

Specification of $Qp_C$ as a function of qPi for ChromaArrayType equal to 1

| | qPi | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

Referring to Table 37, when ChromaArrayType is 1 and $Qp_C$_data_default_flag indicates false (i.e., for example, when $Qp_C$_data_default_flag is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_C$_data_default_flag indicates true (i.e., for example, when $Qp_C$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes a scheme for deriving a chroma quantization parameter $Qp_C$ table without an offset. The present embodiment may be proposed to be used along with an APS or to be used independently. For example, a syntax structure of APS integrated with chroma quantization data may be the same as the following table.

TABLE 38

|  | Descriptor |
|---|---|
| $Qp_C$_data ( ) { |  |
|   qPi_min_idx | ue(v) |
|   qPi_delta_max_idx | ue(v) |
|   for ( i = qPi_min_idx; i <= qPiMaxIdx; i++ ) |  |
|     $Qp_C$_qPi_delta_val[ i ] | ue(v) |
| } |  |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element $Qp_C$_qPi_delta_val[i] may represent a difference between $Qp_C$ values for an i-th index. The difference may also be called a delta.

For example, a parameter $Qp_C$Idx[qPi] may be derived as follows. In this case, the qPi may be 0 to 63.
When qPi<qPi_min_idx, $Qp_C$Idx[qPi] may be set identically with qPi.
qPi=When qPi_min_idx . . . qPiMaxIdx, $Qp_C$Idx[qPi] may be set as $Qp_C$_qPi_delta_val[qPi]+$Qp_C$Idx[qPi−1].
When qPi>qPiMaxIdx, $Qp_C$Idx[qPi] may be set as qPi−(qPiMaxIdx−$Qp_C$Idx[qPiMaxIdx]).
Thereafter, the $Qp_C$ may be set as the $Qp_C$Idx[qPi].

Furthermore, this document proposes another embodiment in which information for a quantization parameter is signaled.

For example, the present embodiment proposes, as an example, a scheme in which a delta (or a difference) between continuous $Qp_C$ values is limited to 1.

For example, the present embodiment proposes a scheme in which user defined chroma quantization ($Qp_C$) is additionally included in the existing image/video standard. For example, the flag of a sequence parameter set (SPS) proposed in the present embodiment may represent whether the existing default table is used for chroma quantization parameter derivation or whether the contents of a table is derived based on information signaled in an SPS. A scheme suitable for a coded image may be selected by accommodating user defined chroma quantization according to the present embodiment, and coding efficiency can be improved.

For example, the present embodiment proposes adding a function for signaling chroma quantization $Qp_C$ as a function of an index qPi by using syntax elements as in the following table.

TABLE 39

|  | Descriptor |
|---|---|
| $Qp_C$_data( ) { |  |
|   qPi_min_idx | ue(v) |
|   qPi_delta_max_idx | ue(v) |
|   for ( i = qPi_min_idx; i <= qPiMaxIdx; i++ ) |  |
|     $Qp_C$_qPi_flag[ i ] | u(1) |
| } |  |

For example, the syntax element qPi_min_idx may represent a minimum qPi index used in chroma quantization. A value of qPi_min_idx may be in a range of 1 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 1 to 63. For example, a maximum index qPiMaxIdx used in $Qp_c$ derivation may be derived like Equation 4.

Furthermore, for example, the syntax element QpC_qPi_flag[i] may represent whether a $Qp_C$ value is increased by 1. That is, for example, the syntax element QpC_qPi_flag[i] may represent whether an (i−1)-th $Qp_C$ value has increased by 1 compared to an (i−1)-th $Qp_C$ value. For example, QpC_qPi_flag[i] having a value of 1 may represent a $Qp_C$ value is increased by 1. QpC_qPi_flag[i] having a value of 0 may represent that a $Qp_C$ value is not increased.

For example, a parameter $Qp_C$Idx[qPi] may be derived as follows. In this case, the qPi may be 0 to 63.
When qPi<qPi_min_idx, $Qp_C$Idx[qPi] may be set identically with qPi.
When qPi=qPi_min_idx . . . qPiMaxIdx, $Qp_C$Idx[qPi] may be set as $Qp_C$_qPi_flag[qPi]+$Qp_C$Idx[qPi−1].
When qPi>qPiMaxIdx, $Qp_C$Idx[qPi] may be set as qPi−(qPiMaxIdx−$Qp_C$Idx[qPiMaxIdx]).
Thereafter, the $Qp_C$ may be set as the $Qp_C$Idx[qPi].

Furthermore, the present embodiment proposes a scheme for signaling a flag representing whether a default table is used for chroma quantization derivation or whether signaled information is used for chroma quantization derivation. The flag may be signaled through a high level syntax, such as a sequence parameter set (SPS), or a picture parameter set (PPS). The flag signaled through a high level syntax may be the same as the following table.

TABLE 40

|  | Descriptor |
|---|---|
| seq_parameter_set_rbsp( ) { |  |
|   sps_decoding_parameter_set_id | u(4) |
|   ... |  |
|   Qpc_data_default_flag | u(1) |

TABLE 40-continued

| Descriptor |
|---|
| if(!Qp$_C$_data_default_flag) |
|    Qp$_C$_data( ) |
| ... |

For example, the syntax element Qp$_C$_data_default_flag may represent whether a user defined mode is used for the derivation of a quantization parameter. For example, Qp$_C$_data_default_flag having a value of 0 may represent that a user defined mode is used for the derivation of a quantization parameter. That is, for example, Qp$_C$_data_default_flag having a value of 0 may represent that chroma quantization parameter data Qp$_C$_data( ) is used. When the Qp$_C$_data_default_flag is 0, the chroma quantization parameter data Qp$_C$_data( ) may be signaled. Furthermore, for example, Qp$_C$_data_default_flag having a value of 1 may represent that a default table is used for the derivation of a quantization parameter. The default table may be the same as Table 7. Furthermore, if Qp$_C$_data_default_flag is not present, the Qp$_C$_data_default_flag may be inferred as 1.

For example, in the present embodiment, if a process of deriving a quantization parameter is written in a standard format, the process may be represented as in the following table.

TABLE 41

| 8.7.1 Derivation process for quantization parameters |
|---|
| Inputs to this process are:<br>  a luma location ( xCb, yCb ) specifying the top-left luma sample of the current coding block relative to the top-left luma sample of the current picture,<br>  a variable cbWidth specifying the width of the current coding block in luma samples,<br>  a variable cbHeight specifying the height of the current coding block in luma samples,<br>  a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.<br>In this process, the luma quantization parameter Qp'$_Y$ and the chroma quantization parameters Qp'$_{Cb}$ and Qp'$_{Cr}$ are derived.<br>The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.<br>NOTE - : The current quantization group is a rectangluar region inside a coding tree block that shares the same qP$_{Y\_PRED}$. Its width and height are equal to the width and height of the coding tree node of which the top-left luma sample position is assigned to the variables CuQgTopLeftX and CuQgTopLeftY.<br>When treeType is equal to SINGLE_TREE or DUAL_TREE_LUMA, the predicted luma quantization parameter qP$_{Y\_PRED}$ is derived by the following ordered steps:<br>  1. The variable qP$_{Y\_PREV}$ is derived as follows:<br>     If one or more of the following conditions are true, qP$_{Y\_PREV}$ is set equal to SliceQp$_Y$:<br>       The current quantization group is the first quantization group in a slice.<br>       The current quantization group is the first quantization group in a brick.<br>     Otherwise, qP$_{Y\_PREV}$ is set<br>  2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable qP$_{Y\_A}$ is derived as follows:<br>     If one or more of the following conditions are true, qP$_{Y\_A}$ is set equal to qP$_{Y\_PREV}$:<br>       availableA is equal to FALSE.<br>       the CTB address ctbAddrA of the CTB containing the luma coding block covering the luma location ( xQg − 1, yQg ) is not equal to CtbAddrInBs, where ctbAddrA is derived as follows:<br>         xTmp = ( xQg − 1 ) >> MinTbLog2SizeY<br>         yTmp = yQg >> MinTbLog2SizeY<br>         minTbAddrA = MinTbAddrZs[ xTmp ][ yTmp ]<br>         ctbAddrA = minTbAddrA >> ( 2 * ( CtbLog2SizeY − MinTbLog2SizeY ) )<br>     Otherwise, qP$_{Y\_A}$ is set equal to the luma quantization parameter Qp$_Y$ of the coding unit containing the luma coding block covering ( xQg − 1, yQg ).<br>  3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable qP$_{Y\_B}$ is derived as follows:<br>     If one or more of the following conditions are true, qP$_{Y\_B}$ is set equal to qP$_{Y\_PREV}$:<br>       availableB is equal to FALSE.<br>       the CTB address ctbAddrB of the CTB containing the luma coding block covering the luma location ( xQg, yQg − 1 ) is not equal to CtbAddrInBs, where ctbAddrB is derived as follows:<br>         xTmp = xQg >> MinTbLog2SizeY<br>         yTmp = ( yQg − 1 ) >> MinTbLog2SizeY<br>         minTbAddrB = MinTbAddrZs[ xTmp ][ yTmp ]<br>         ctbAddrB =<br>         minTbAddrB >> ( 2 * ( CtbLog2SizeY " MinTbLog2SizeY ) )   (8-922)<br>     Otherwise, qP$_{Y\_B}$ is set equal to the luma quantization parameter Qp$_Y$ of the coding unit containing the luma coding block covering ( xQg, yQg " 1 ). |

TABLE 41-continued

4. The predicted luma quantization parameter $qP_{Y\_PRED}$ is derived as follows:
   If all the following conditions are true, then $qP_{Y\_PRED}$ is set equal to the luma quantization parameter $Qp_Y$ of the coding unit containing the luma coding block covering ( xQg, yQg − 1 ):
      availableB is equal to TRUE.
      the current quantization group is the first quantization group in a CTB row within a brick
   Otherwise, $qP_{Y\_PRED}$ is derived as follows:
      $qP_{Y\_PRFD} = ( ( qP_{Y\_A} + qP_{Y\_B} + 1 ) >> 1$
The variable $Qp_Y$ is derived as follows:
   $QP_Y =$
   $( ( qP_{Y\_PRED} + CuQpDeltaVal + 64 + 2 * QpBdOffset_Y )\%( 64 + QpBdOffset_Y ) ) -$
   $QpBdOffset_Y$
The luma quantization parameter $Qp'_Y$ is derived as follows:
   $Qp'_Y = Qp_Y + QpBdOffset_Y$
When ChromaArrayType is not equal to 0 and treeType is equal to SINGLE_TREE or DUAL_TREE_CHROMA, the following applies:
   When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).
   The variables $qP_{Cb}$, $qP_{Cr}$ and $qP_{CbCr}$ are derived as follows:
      $qPi_{Cb} = Clip3( - QpBdOffset_C, 69, Qp_Y + pps\_cb\_qp\_offset + slice\_cb\_qp\_offset )$
      $qPi_{Cr} = Clip3( - QpBdOffset_C, 69, Qp_Y + pps\_cr\_qp\_offset + slice\_cr\_qp\_offset )$
      $qPi_{CbCr} = Clip3( - QpBdOffset_C, 69, Qp_Y + pps\_joint\_cbcr\_qp\_offset + slice\_joint\_cbcr\_qp\_offset )$
   If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively.
   If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively.

TABLE 8-15

Specification of $Qp_C$ as a function of qPi for ChromaArrayType equal to 1

| | qPi | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

Referring to Table 41, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Figure 4:
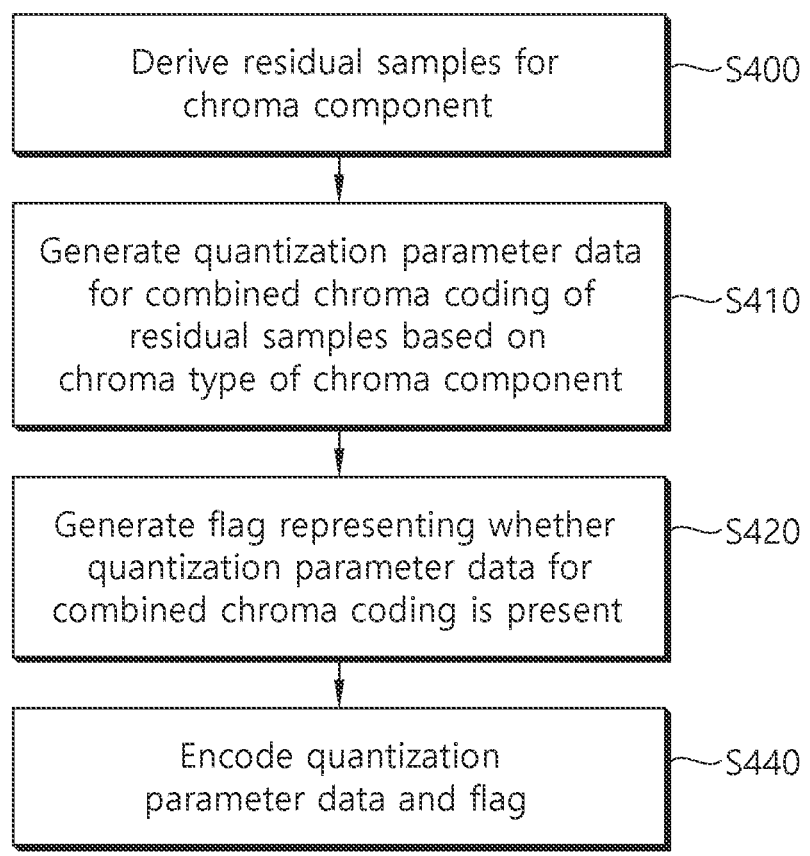
FIG. 4 schematically shows an image encoding method by an encoding apparatus according to the present document.

FIG. 4 schematically shows an image encoding method by an encoding apparatus according to the present document. The method disclosed in FIG. 4 may be performed by the encoding apparatus disclosed in FIG. 2. Specifically, for example, S400 to S420 in FIG. 4 may be performed by the residual processor of the encoding apparatus. S430 may be performed by the entropy encoder of the encoding apparatus. Furthermore, although not illustrated, a process of generating reconstructed samples and a reconstructed picture based on residual samples and prediction samples may be performed by the adder of the encoding apparatus.

The encoding apparatus derives residual samples for a chroma component (S400). For example, the encoding apparatus may derive the residual samples by subtracting original samples and prediction samples for a current block in a current picture.

Meanwhile, the encoding apparatus may derive the prediction samples of the current block based on a prediction mode. In this case, various prediction methods disclosed in this document, such as inter prediction or intra prediction, may be used.

For example, the encoding apparatus may determine whether to perform inter prediction or intra prediction on the current block, and may determine a detailed inter prediction mode or a detailed intra prediction mode based on RD costs. The encoding apparatus may derive prediction samples for the current block based on the determined mode.

The encoding apparatus generates quantization parameter data for combined chroma coding of the residual samples based on the chroma type of the chroma component (S410). The encoding apparatus may generate the quantization parameter data for the combined chroma coding of the residual samples based on a chroma type. In this case, the chroma type may mean the aforementioned ChromaArrayType. For example, if a value of the chroma type is not 0, the encoding apparatus may generate the quantization parameter data for the combined chroma coding. For example, when a value of the chroma type is 1, the decoding apparatus may generate the quantization parameter data for the combined chroma coding. In this case, when a value of the chroma type is 0, the chroma type may be a Monochrome format. When a value of the chroma type is 1, the chroma type may be a 4:2:0 format. When a value of the chroma type is 2, the chroma type may be a 4:2:2 format. When a value of the chroma type is 3, the chroma type may be a 4:4:4 format. Furthermore, the combined chroma coding may also be called joint coding of a chroma component. The chroma component may include a Cb component and/or a Cr component.

Furthermore, for example, the encoding apparatus may determine whether to perform combined chroma coding on residual samples for a chroma component based on a chroma type (e.g., when a value of the chroma type is not 0). If the combined chroma coding is performed on the residual samples, quantization parameter data for the combined chroma coding of the residual samples may be generated. For example, the quantization parameter data may be signaled through a high level syntax. For example, the quantization parameter data may be signaled through a sequence parameter set (SPS), a picture parameter set (PPS), a slice header, or an adaptation parameter set (APS).

For example, the quantization parameter data may include a syntax element representing a starting index of a chroma quantization parameter table for the combined chroma coding and/or a syntax element representing a difference between the starting index and last index of the chroma quantization parameter table. The syntax element representing the starting index may be the aforementioned qPi_min_idx. Furthermore, the syntax element representing the difference between the starting index and the last index may be qPi_delta_max_idx. Furthermore, the chroma quantization parameter table may also be called a chroma quantization parameter mapping table or a user defined quantization parameter mapping table. Furthermore, the starting index may also be called a minimum index. Furthermore, for example, the syntax element representing the starting index and/or the syntax element representing the difference between the starting index and the last index may be signaled through a high level syntax. For example, the syntax element representing the starting index and/or the syntax element representing the difference between the starting index and the last index may be signaled through a sequence parameter set (SPS), a picture parameter set (PPS), a slice header, or an adaptation parameter set (APS).

Furthermore, for example, the quantization parameter data may include syntax elements for quantization parameter values of indices of the chroma quantization parameter table. That is, for example, the quantization parameter data may include a syntax element for a quantization parameter value of each of indices of the chroma quantization parameter table. The syntax element for the quantization parameter value of the index may be the aforementioned $Qp_{C\_}qPi\_val[i]$. Furthermore, for example, the syntax element for the quantization parameter value of the index may be signaled through a high level syntax. For example, the syntax element for the quantization parameter value of the index may be signaled through a sequence parameter set (SPS), a picture parameter set (PPS), a slice header, or an adaptation parameter set (APS).

Furthermore, for example, the quantization parameter data may include a syntax element representing an offset for the derivation of a quantization parameter for the combined chroma coding. The syntax element representing the offset may be the aforementioned $QpOffset_C$. Furthermore, for example, the syntax element representing the offset may be signaled through a high level syntax. For example, the syntax element representing the offset may be signaled through a sequence parameter set (SPS), a picture parameter set (PPS), a slice header, or an adaptation parameter set (APS).

Meanwhile, for example, the encoding apparatus may derive the quantization parameter for the combined chroma coding based on the quantization parameter data. The quantization parameter for the combined chroma coding may represent the aforementioned $QP'_{CbCr}$.

For example, as in the aforementioned contents, the chroma quantization parameter table may be derived based on the syntax element representing the starting index of the chroma quantization parameter table, the syntax element representing the difference between the starting index and last index of the chroma quantization parameter table and/or the syntax elements for the quantization parameter values of the indices of the chroma quantization parameter table. That is, for example, the chroma quantization parameter table for the combined chroma coding may be derived based on the quantization parameter data. Thereafter, an index for the combined chroma coding may be derived based on a quantization parameter for a luma component. The quantization parameter for the combined chroma coding may be derived based on a quantization parameter for the index of the chroma quantization parameter table. That is, for example, the quantization parameter for the combined chroma coding may be derived based on a quantization parameter for the same index as the quantization parameter of the luma component in the chroma quantization parameter table.

In addition, for example, the quantization parameter (e.g., $QP'_{CbCr}$) for the combined chroma coding may be derived by adding an offset to the quantization parameter (e.g., $QP_{CbCr}$) for the index of the chroma quantization parameter table. The offset may be derived based on a syntax element representing an offset for the derivation of the quantization parameter for the combined chroma coding.

The encoding apparatus generates a flag representing whether the quantization parameter data for the combined chroma coding is present (S420). For example, the encoding apparatus may generate whether a flag representing whether the quantization parameter data for the combined chroma coding is present based on the chroma type. For example, when a value of the chroma type is not 0, the encoding apparatus may generate the flag representing whether the quantization parameter data for the combined chroma coding is present. For example, when a value of the chroma type is 1, the encoding apparatus may generate the flag representing whether the quantization parameter data for the combined chroma coding is present. For example, the syntax element for the flag may be the aforementioned $Qp_{C\_}data\_present\_flag$.

For example, when a value of the flag is 0, the flag may represent that the quantization parameter data for the combined chroma coding is not present. When a value of the flag is 1, the flag may represent that the quantization parameter data for the combined chroma coding is present.

Furthermore, for example, the flag may be signaled through a high level syntax. For example, the flag may be signaled through a sequence parameter set (SPS), a picture parameter set (PPS), a slice header, or an adaptation parameter set (APS).

The encoding apparatus encodes the quantization parameter data and the flag (S430). The encoding apparatus may encode the quantization parameter data and the flag. Image information may include the quantization parameter data and the flag.

The encoding apparatus may encode the image information including the quantization parameter data and the flag.

Meanwhile, for example, the encoding apparatus may generate and encode prediction information for the current block. The prediction information may include prediction mode information for the current block. The image information may include the prediction information.

Furthermore, for example, the encoding apparatus may encode residual information for the residual samples. The image information may include the residual information. Furthermore, for example, the encoding apparatus may output the image information in the form of a bitstream by encoding the image information.

Meanwhile, the bitstream including the image information may be transmitted to the decoding apparatus over a network or a (digital) storage medium. In this case, the network may include a broadcasting network and/or a communication network. The digital storage medium may include various storage media, such as a USB, an SD, a CD, a DVD, Blu-ray, an HDD, and an SSD.

Figure 5:
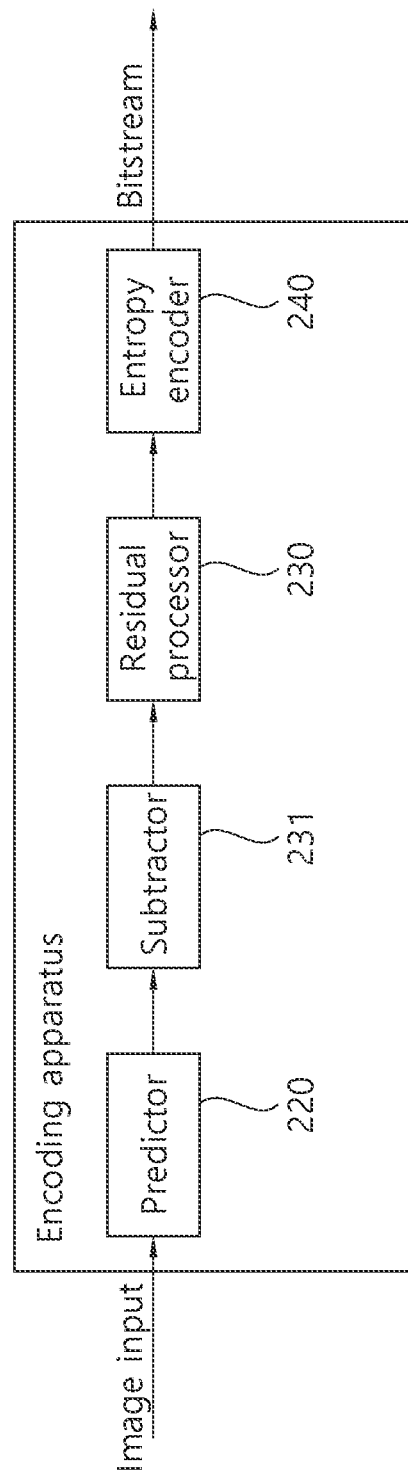
FIG. 5 schematically shows an encoding apparatus for performing an image encoding method according to this document.

FIG. 5 schematically shows an encoding apparatus for performing an image encoding method according to this document. The method disclosed in FIG. 4 may be performed by the encoding apparatus disclosed in FIG. 5. Specifically, for example, the residual processor of the encoding apparatus in FIG. 5 may perform S400 to S420. The entropy encoder of the encoding apparatus may perform S430. Furthermore, although not illustrated, a process of generating reconstructed samples and a reconstructed picture based on the residual samples and prediction samples may be performed by the adder of the encoding apparatus.

Figure 6:
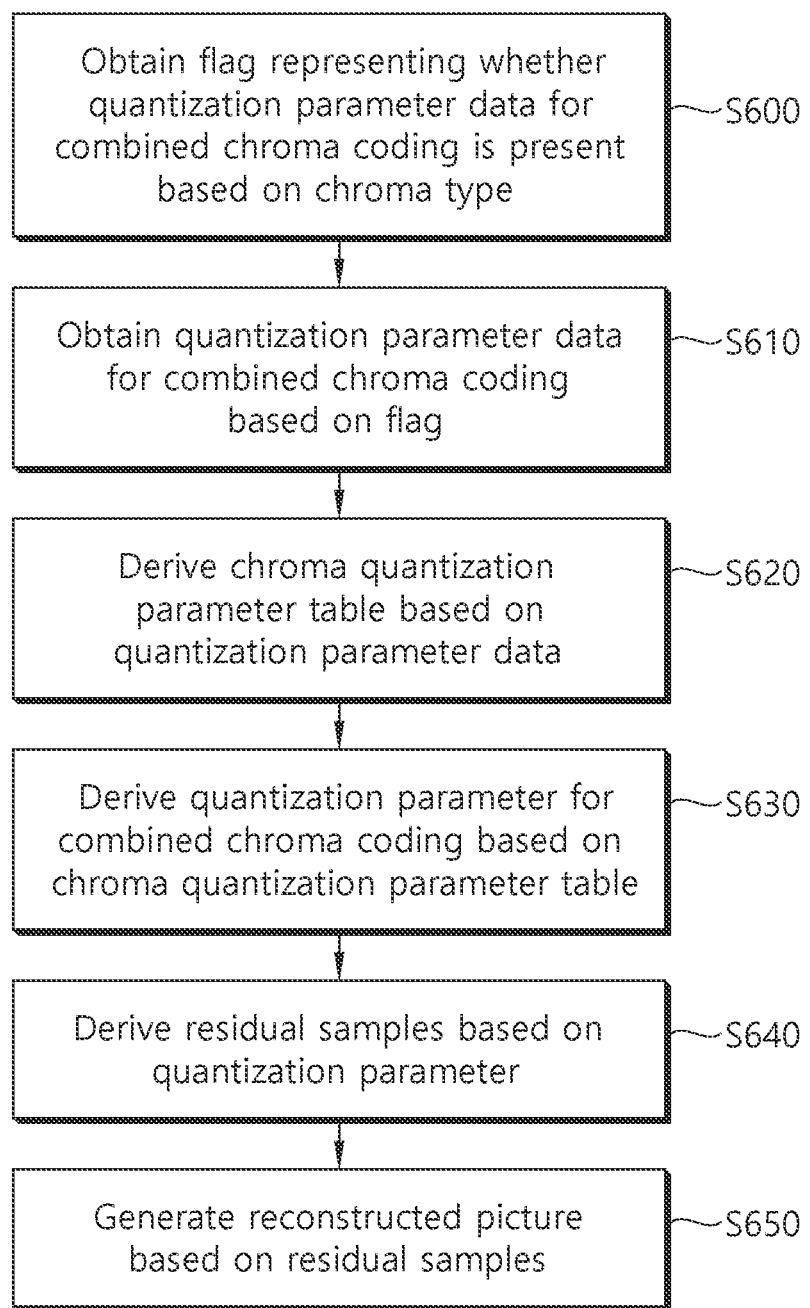
FIG. 6 schematically shows an image decoding method by a decoding apparatus according to this document.

FIG. 6 schematically shows an image decoding method by a decoding apparatus according to this document. The method disclosed in FIG. 6 may be performed by the decoding apparatus disclosed in FIG. 3. Specifically, for example, S600 in FIG. 6 may be performed by the entropy decoder of the decoding apparatus. S610 to S640 in FIG. 6 may be performed by the residual processor of the decoding apparatus. S650 in FIG. 6 may be performed by the adder of the decoding apparatus.

The decoding apparatus obtains a flag representing whether quantization parameter data for combined chroma coding is present based on a chroma type (S600). The decoding apparatus may obtain the image information through a bitstream. For example, the image information may include information for a chroma quantization parameter. For example, the image information may include the flag representing whether the quantization parameter data for the combined chroma coding is present. For example, the decoding apparatus may obtain the flag representing whether the quantization parameter data for the combined chroma coding is present based on the chroma type. In this case, the chroma type may mean the aforementioned ChromaArrayType. For example, when a value of the chroma type is not 0, the decoding apparatus may obtain a flag representing whether quantization parameter data for combined chroma coding is present. For example, when a value of the chroma type is 1, the decoding apparatus may obtain a flag representing whether quantization parameter data for combined chroma coding is present. In this case, when a value of the chroma type is 0, the chroma type may be a monochrome format. When a value of the chroma type is 1, the chroma type may be a 4:2:0 format. When a value of the chroma type is 2, the chroma type may be a 4:2:2 format. When a value of the chroma type is 3, the chroma type may be a 4:4:4 format. Furthermore, the combined chroma coding may also be called joint coding of a chroma component. The chroma component may include a Cb component and/or a Cr component. For example, a syntax element for the flag may be the aforementioned $Qp_C\_data\_present\_flag$.

For example, when a value of the flag is 0, the flag may represent that the quantization parameter data for the combined chroma coding is not present. When a value of the flag is 1, the flag may represent that the quantization parameter data for the combined chroma coding is present.

Furthermore, for example, the flag may be signaled through a high level syntax. For example, the flag may be signaled through a sequence parameter set (SPS), a picture parameter set (PPS), a slice header, or an adaptation parameter set (APS).

The decoding apparatus obtains the quantization parameter data for the combined chroma coding based on the flag (S610). The decoding apparatus may obtain the quantization parameter data for the combined chroma coding based on the flag. For example, the decoding apparatus may obtain the quantization parameter data for the combined chroma coding based on the flag representing that the quantization parameter data for the combined chroma coding is present. That is, for example, when a value of the flag is 1, the decoding apparatus may obtain the quantization parameter data for the combined chroma coding. Furthermore, for example, the quantization parameter data may be signaled through a high level syntax. For example, the quantization parameter data may be signaled through a sequence parameter set (SPS), a picture parameter set (PPS), a slice header, or an adaptation parameter set (APS).

For example, the quantization parameter data may include a syntax element representing a starting index of a chroma quantization parameter table for the combined chroma coding and/or a syntax element representing a difference between the starting index and last index of the chroma quantization parameter table. The syntax element representing the starting index may be the aforementioned qPi_min_idx. Furthermore, the syntax element representing the difference between the starting index and the last index may be qPi_delta_max_idx. Furthermore, the chroma quantization parameter table may also be called a chroma quantization parameter mapping table or a user defined quantization parameter mapping table. Furthermore, the starting index may also be called a minimum index. Furthermore, for example, the syntax element representing the starting index and/or the syntax element representing the difference between the starting index and the last index may be signaled through a high level syntax. For example, the syntax element representing the starting index and/or the syntax element representing the difference between the starting index and the last index may be signaled through a sequence parameter set (SPS), a picture parameter set (PPS), a slice header, or an adaptation parameter set (APS).

Furthermore, for example, the quantization parameter data may include syntax elements for quantization parameter values of indices of the chroma quantization parameter table. That is, for example, the quantization parameter data may include a syntax element for a quantization parameter value of each of indices of the chroma quantization parameter table. The syntax element for the quantization parameter value of the index may be the aforementioned $Qp_C\_qPi\_val[i]$. Furthermore, for example, the syntax element for the quantization parameter value of the index may be signaled through a high level syntax. For example, the syntax element for the quantization parameter value of the index may be signaled through a sequence parameter set (SPS), a picture parameter set (PPS), a slice header, or an adaptation parameter set (APS).

Furthermore, for example, the quantization parameter data may include a syntax element representing an offset for the derivation of a quantization parameter for the combined chroma coding. The syntax element representing the offset may be the aforementioned $QpOffset_C$. Furthermore, for example, the syntax element representing the offset may be signaled through a high level syntax. For example, the syntax element representing the offset may be signaled through a sequence parameter set (SPS), a picture parameter set (PPS), a slice header, or an adaptation parameter set (APS).

The decoding apparatus derives a chroma quantization parameter table based on the quantization parameter data (S620). The decoding apparatus may derive a chroma quantization parameter table for the combined chroma coding based on the quantization parameter data. The chroma quantization parameter table may be called a chroma quantization parameter mapping table or a user defined quantization parameter mapping table.

For example, as in the aforementioned contents, the chroma quantization parameter table may be derived based on the syntax element representing the starting index of the chroma quantization parameter table, the syntax element representing the difference between the starting index and last index of the chroma quantization parameter table and/or the syntax elements for the quantization parameter values of the indices of the chroma quantization parameter table. That is, for example, the chroma quantization parameter table for the combined chroma coding may be derived based on the quantization parameter data.

The decoding apparatus derives the quantization parameter for the combined chroma coding based on the chroma quantization parameter table (S630). The quantization parameter for the combined chroma coding may represent the aforementioned $QP'_{CbCr}$.

For example, an index for the combined chroma coding may be derived based on a quantization parameter for a luma component. The quantization parameter for the combined chroma coding may be derived based on a quantization parameter for the index of the chroma quantization parameter table. That is, for example, the quantization parameter for the combined chroma coding may be derived based on the quantization parameter for the same index as the quantization parameter of the luma component in the chroma quantization parameter table.

Furthermore, for example, the quantization parameter (e.g., $QP'_{CbCr}$) for the combined chroma coding may be derived by adding an offset to the quantization parameter (e.g., $QP_{CbCr}$) for the index of the chroma quantization parameter table. The offset may be derived based on a syntax element representing an offset for the derivation of a quantization parameter for the combined chroma coding.

The decoding apparatus derives residual samples based on the quantization parameter (S640). The decoding apparatus may derive the residual samples based on the quantization parameter. For example, the decoding apparatus may derive transform coefficients based on residual information, may derive the residual samples by dequantizing the transform coefficients. Alternatively, for example, the decoding apparatus may derive transform coefficients based on residual information, may derive inverse-transformed transform coefficients by inverse-transforming the transform coefficients, and may derive the residual samples by dequantizing the inverse-transformed transform coefficients.

The decoding apparatus generates a reconstructed picture based on the residual samples (S650). For example, the decoding apparatus may generate the reconstructed picture based on the residual samples.

Meanwhile, for example, the decoding apparatus may derive prediction samples by performing an inter prediction mode or an intra prediction mode on the current block based on prediction information received through a bitstream, and may generate the reconstructed samples by adding the prediction samples and the residual samples.

Thereafter, if necessary, in order to improve subjective/objective picture quality, an in-loop filtering procedure, such as deblocking filtering, an SAO and/or an ALF procedure, may be applied to the reconstructed samples as described above.

Figure 7:
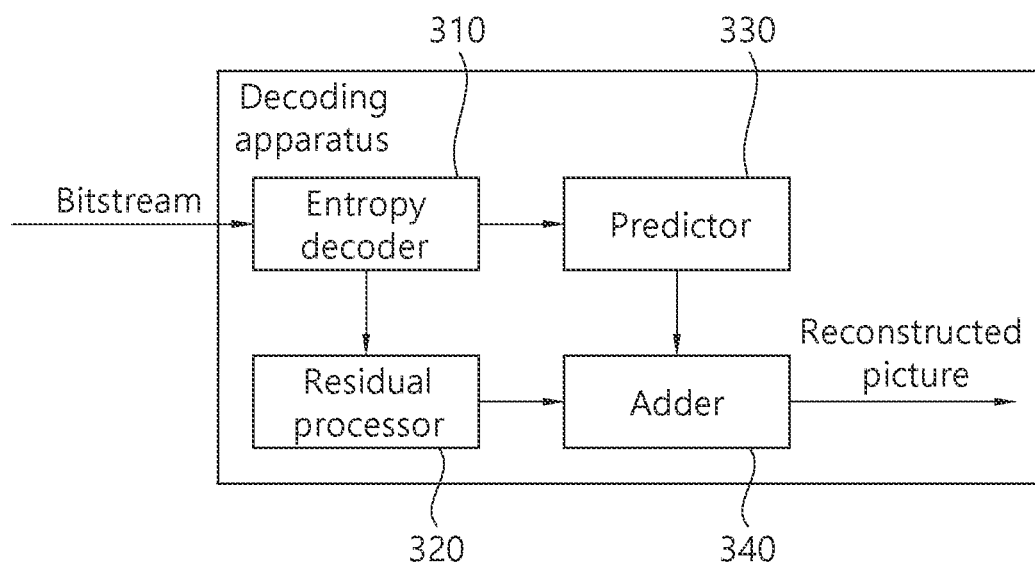
FIG. 7 schematically shows a decoding apparatus for performing an image decoding method according to this document.

FIG. 7 schematically illustrates the decoding apparatus performing the image decoding method according to this document. The method disclosed in FIG. 6 may be performed by the decoding apparatus disclosed in FIG. 7. Specifically, for example, the entropy decoder of the decoding apparatus of FIG. 7 may perform S600 in FIG. 6. The residual processor of the decoding apparatus of FIG. 7 may perform S610 to S640 of FIG. 6. The adder of the decoding apparatus of FIG. 7 may perform S650 in FIG. 6.

According to the present disclosure, the chroma quantization parameter table for quantization parameter derivation can be determined based on a flag representing whether to transmit quantization parameter data for quantization parameter derivation for a chroma component. Coding efficiency can be improved by performing coding based on a quantization parameter according to characteristics of an image.

Furthermore, according to the present disclosure, a chroma quantization parameter table for a chroma component can be determined based on signaled chroma quantization data. Coding efficiency can be improved by performing coding based on a quantization parameter according to characteristics of an image.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 8:
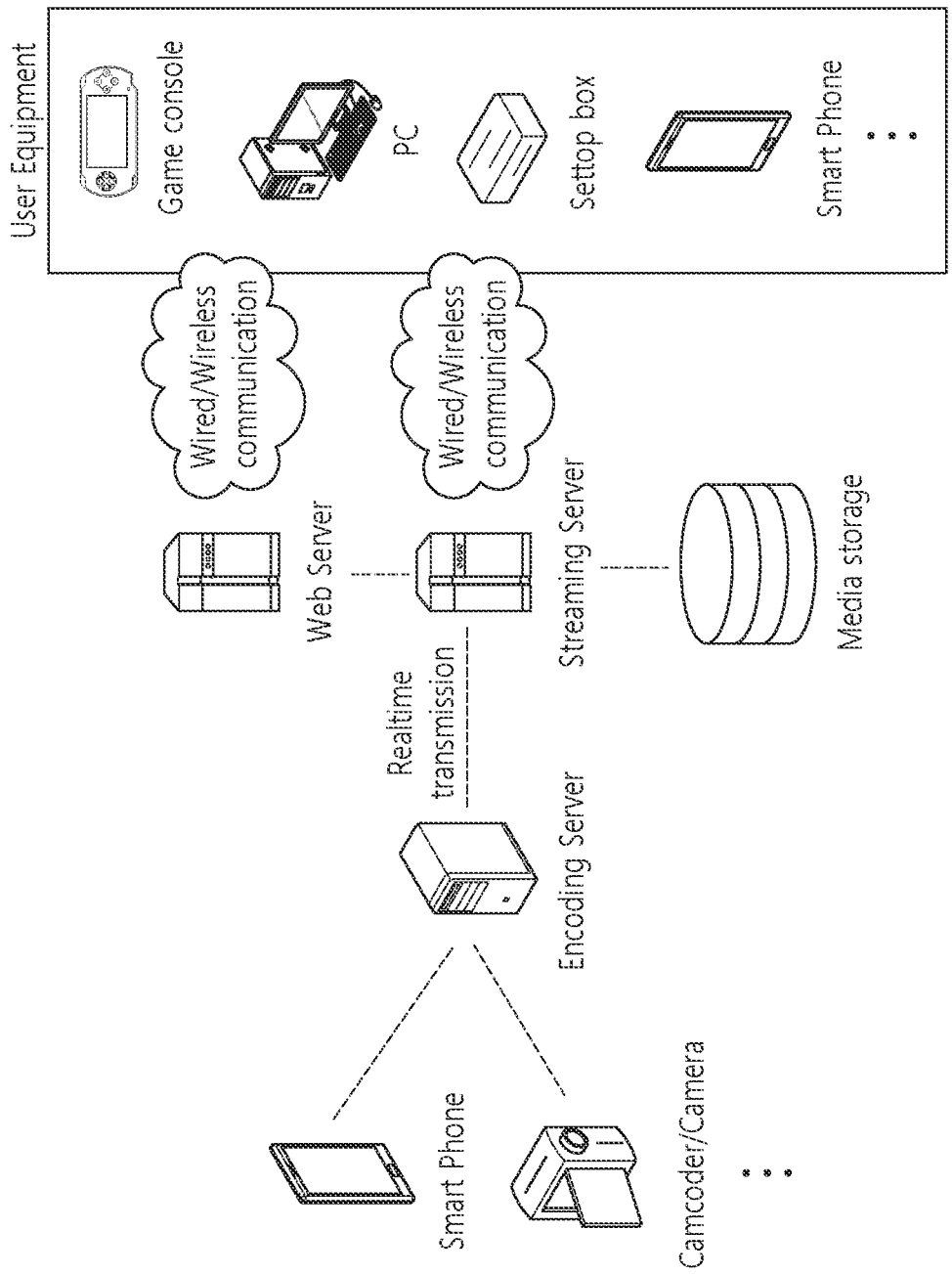
FIG. 8 illustrates a structural diagram of a contents streaming system to which the present disclosure is applied.

FIG. 8 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method, performed by a decoding apparatus, comprising:
   obtaining a flag representing whether quantization parameter data for combined chroma coding is present based on a chroma type;
   obtaining the quantization parameter data for the combined chroma coding based on the flag;
   deriving a chroma quantization parameter table based on the quantization parameter data;
   deriving a quantization parameter for the combined chroma coding based on the chroma quantization parameter table;
   deriving residual samples based on the quantization parameter; and
   generating a reconstructed picture based on the residual samples,
   wherein the quantization parameter data includes a syntax element for a starting quantization parameter of the chroma quantization parameter table and a syntax element for a number of quantization parameters in the chroma quantization parameter table.

2. The image decoding method of claim 1, wherein when a value of the flag is 1, the flag represents that the quantization parameter data for the combined chroma coding is present.

3. The image decoding method of claim 1, wherein the flag is signaled through a sequence parameter set (SPS).

4. The image decoding method of claim 1, wherein the quantization parameter data includes syntax elements for quantization parameter values of indices of the chroma quantization parameter table.

5. The image decoding method of claim 1, wherein a value of the chroma type is not 0.

6. The image decoding method of claim 1, wherein the quantization parameter for the combined chroma coding is derived based on a quantization parameter for an index identical with an index of a quantization parameter for a luma component corresponding to the current chroma block.

7. The image decoding method of claim 1, wherein the quantization parameter data includes a syntax element representing an offset for deriving the quantization parameter for the combined chroma coding.

8. The image decoding method of claim 7, wherein the flag is signaled through a picture parameter set (PPS).

9. An image encoding method, performed by an encoding apparatus, comprising:
   deriving residual samples for a chroma component;
   generating quantization parameter data for combined chroma coding of the residual samples based on a chroma type of the chroma component;

generating a flag representing whether the quantization parameter data for the combined chroma coding is present; and encoding the quantization parameter data and the flag, wherein the quantization parameter data includes a syntax element for a starting quantization parameter of a chroma quantization parameter table and a syntax element for a number of quantization parameters in the chroma quantization parameter table.

10. The image encoding method of claim 9, wherein when a value of the flag is 1, the flag represents that the quantization parameter data for the combined chroma coding is present.

11. The image encoding method of claim 9, wherein the flag is signaled through a sequence parameter set (SPS).

12. The image encoding method of claim 9, wherein the quantization parameter data includes syntax elements for quantization parameter values of indices of the chroma quantization parameter table.

13. The image encoding method of claim 12, wherein the chroma quantization parameter table for the combined chroma coding is derived based on the quantization parameter data, wherein a quantization parameter for the combined chroma coding is derived based on the chroma quantization parameter table.

14. The image encoding method of claim 9, wherein the quantization parameter data includes a syntax element representing an offset for deriving the quantization parameter for the combined chroma coding.

15. A non-transitory computer-readable storage medium storing a bitstream generated by a method, the method comprising:

deriving residual samples for a chroma component;

generating quantization parameter data for combined chroma coding of the residual samples based on a chroma type of the chroma component;

generating a flag representing whether the quantization parameter data for the combined chroma coding is present;

encoding the quantization parameter data and the flag; and generating the bitstream including the quantization parameter data and the flag, wherein the quantization parameter data includes a syntax element for a starting quantization parameter of a chroma quantization parameter table and a syntax element for a number of quantization parameters in the chroma quantization parameter table.

* * * * *